US012586415B2

(12) United States Patent (10) Patent No.: US 12,586,415 B2
Kawamura et al. (45) Date of Patent: Mar. 24, 2026

(54) INFORMATION PROCESSING METHOD, INFORMATION PROCESSING SYSTEM, AND INFORMATION TERMINAL TO ASSIST USER LEARNING

(71) Applicant: SONY GROUP CORPORATION, Tokyo (JP)

(72) Inventors: Kazuki Kawamura, Tokyo (JP); Junichi Rekimoto, Tokyo (JP); Kojiro Kashiwa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 236 days.

(21) Appl. No.: 18/261,139

(22) PCT Filed: Nov. 16, 2021

(86) PCT No.: PCT/JP2021/042119
§ 371 (c)(1),
(2) Date: Jul. 12, 2023

(87) PCT Pub. No.: WO2022/158099
PCT Pub. Date: Jul. 28, 2022

(65) Prior Publication Data
US 2024/0071139 A1 Feb. 29, 2024

Related U.S. Application Data

(60) Provisional application No. 63/139,971, filed on Jan. 21, 2021.

(51) Int. Cl.
*G06V 40/20* (2022.01)
*G09B 19/00* (2006.01)
*G09B 19/04* (2006.01)

(52) U.S. Cl.
CPC ......... *G06V 40/23* (2022.01); *G09B 19/0038* (2013.01); *G09B 19/04* (2013.01)

(58) Field of Classification Search
None
See application file for complete search history.

(56) References Cited

U.S. PATENT DOCUMENTS

2009/0258333 A1 10/2009 Yu
2020/0001159 A1* 1/2020 Sazuka ................. G06V 40/23
(Continued)

FOREIGN PATENT DOCUMENTS

CN 110337316 A 10/2019
CN 110826303 A 2/2020
(Continued)

OTHER PUBLICATIONS

Tsukamoto Yuichi, JP-2016090900-A English Translation, Abstract, par 0029, 0043 (Year: 2016).*
(Continued)

*Primary Examiner* — Miya J Cato
(74) *Attorney, Agent, or Firm* — CHIP LAW GROUP

(57) ABSTRACT

Provided is an information processing method that includes an input step of inputting time-series media information representing a movement or conduct of a learning user, a first determination step of determining a learning level of the user on the basis of the time-series media information, and an output step of outputting a portion in the time-series media information at which the movement or action by the user is different from a reference movement or action, on the basis of the learning level of the user determined in the first determination step.

17 Claims, 20 Drawing Sheets

(56) References Cited

U.S. PATENT DOCUMENTS

| | | | | |
|---|---|---|---|---|
| 2020/0051446 A1* | 2/2020 | Rubinstein | .............. | G06N 20/00 |
| 2021/0019374 A1* | 1/2021 | Donaldson | .............. | G06N 3/045 |
| 2022/0284891 A1* | 9/2022 | Park | ......................... | G10L 15/22 |
| 2023/0260520 A1* | 8/2023 | Medalion | ............. | H04L 12/1831 |
| | | | | 704/232 |

FOREIGN PATENT DOCUMENTS

| | | | | |
|---|---|---|---|---|
| JP | 3930402 | B2 | | 6/2007 |
| JP | 5756555 | B1 | | 7/2015 |
| JP | 2016090900 | A | * | 5/2016 |
| JP | 2020-042330 | A | | 3/2020 |
| JP | 2020149601 | A | * | 9/2020 |
| JP | 2021-001959 | A | | 1/2021 |
| JP | 2021-113904 | A | | 8/2021 |
| WO | 2018/179664 | A1 | | 10/2018 |
| WO | 2018/220948 | A1 | | 12/2018 |

OTHER PUBLICATIONS

Asano Shuhei, JP-2020149601-A English Translation, Abstract, par 0008, 0015, 0025-0027 (Year: 2020).*
International Search Report and Written Opinion of PCT Application No. PCT/JP2021/042119, issued on Feb. 15, 2022, 14 pages of ISRWO.

* cited by examiner

USER

MOVEMENT/ACTION

SENSOR SECTION 101

TIME-SERIES MEDIA INFORMATION (SOUND VIDEO ...)

INPUT SECTION 102

DETERMINING SECTION 103

DETERMINATION RESULT
- IS LEARNING ADEQUATE?
- INADEQUATELY-LEARNED PORTION
- DISTANCE TO REFERENCE MOVEMENT/ACTION

PRESENTING SECTION 104

INFORMATION PROCESSING SYSTEM 100

F I G . 2
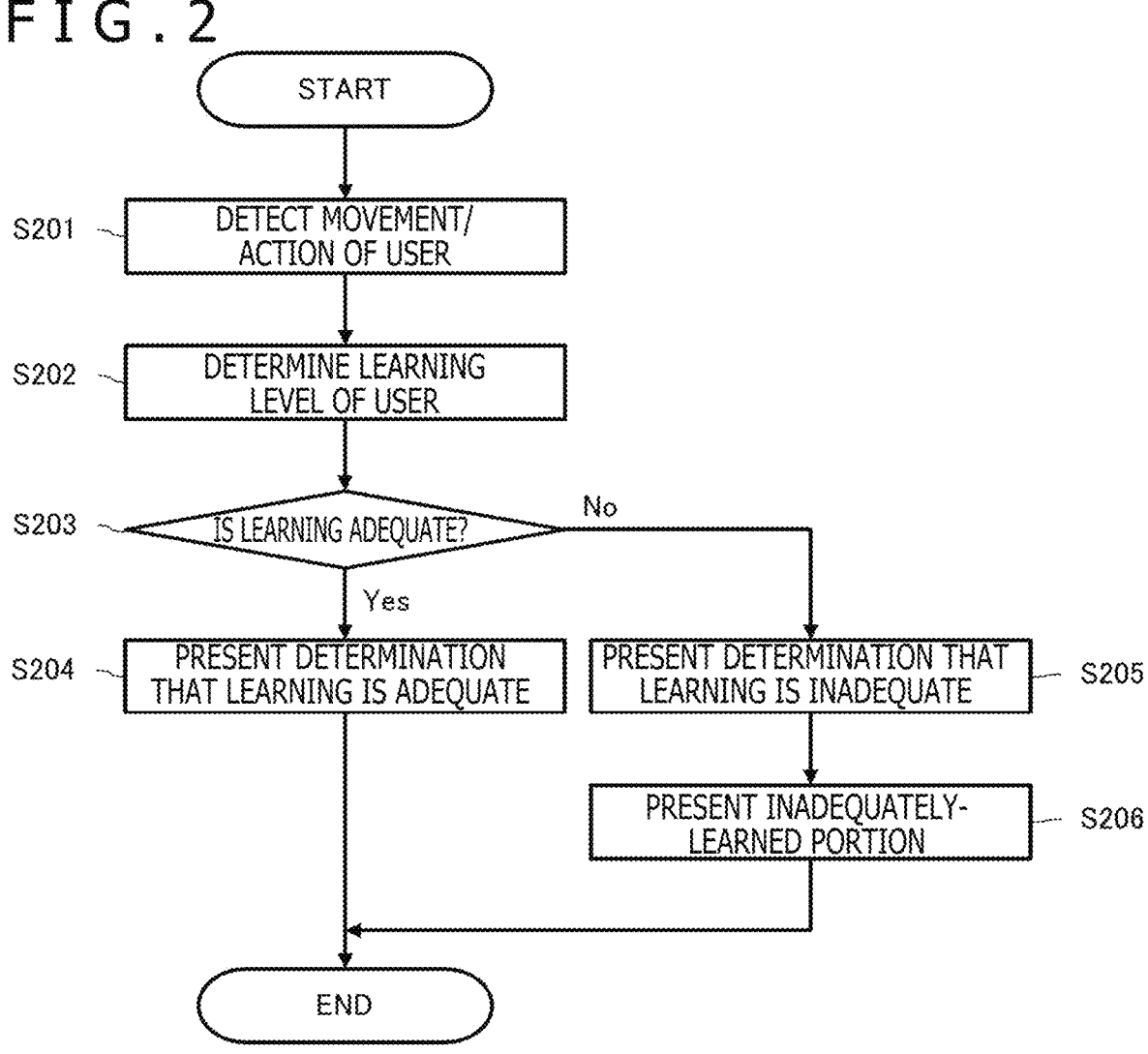

F I G . 3
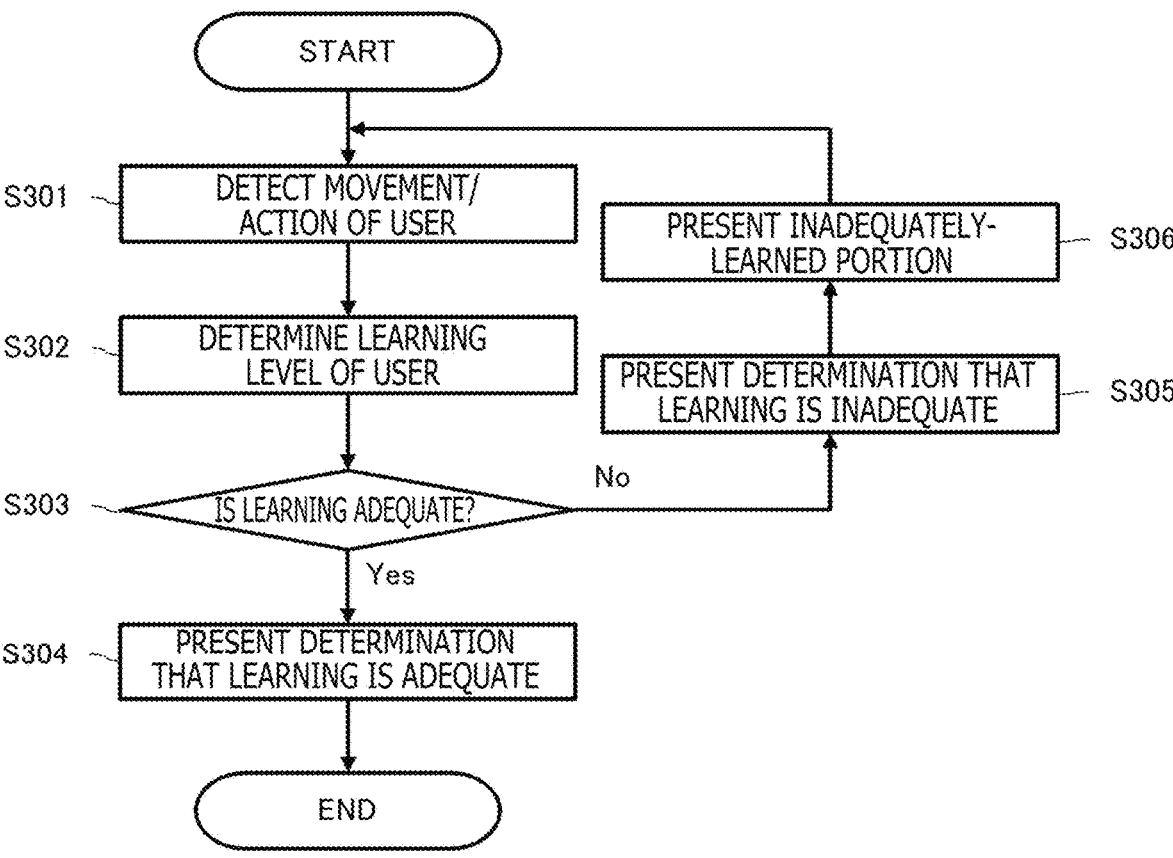
F I G . 4
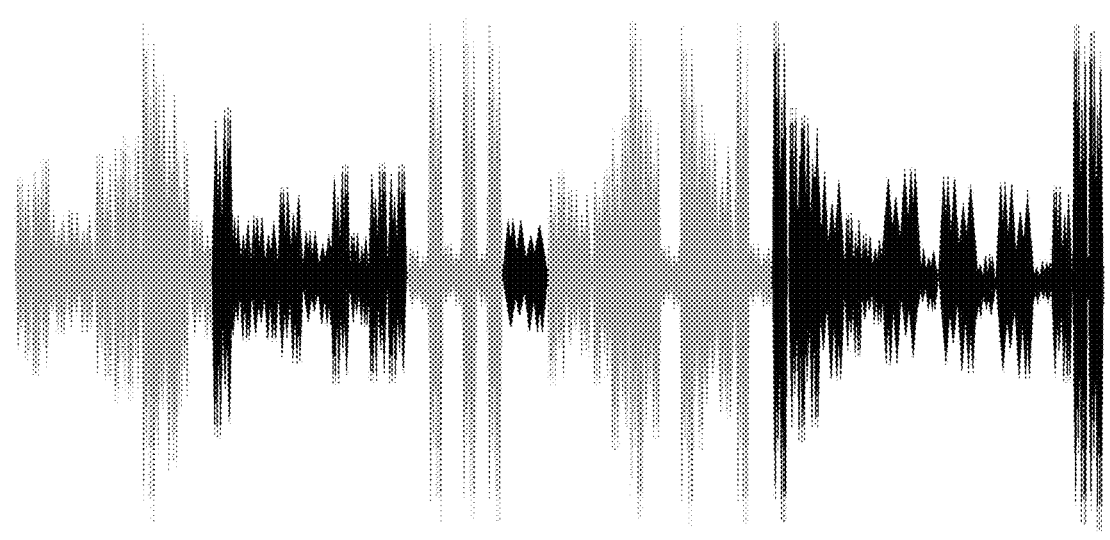

This was easy for us

This was easy for us

FIG.16
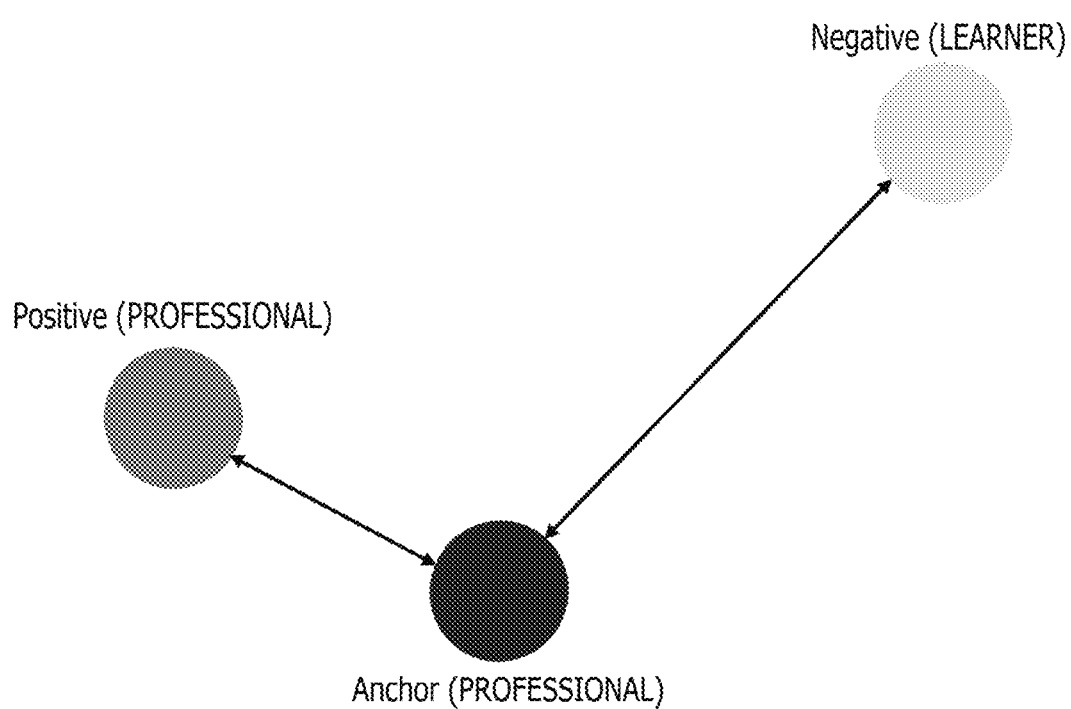
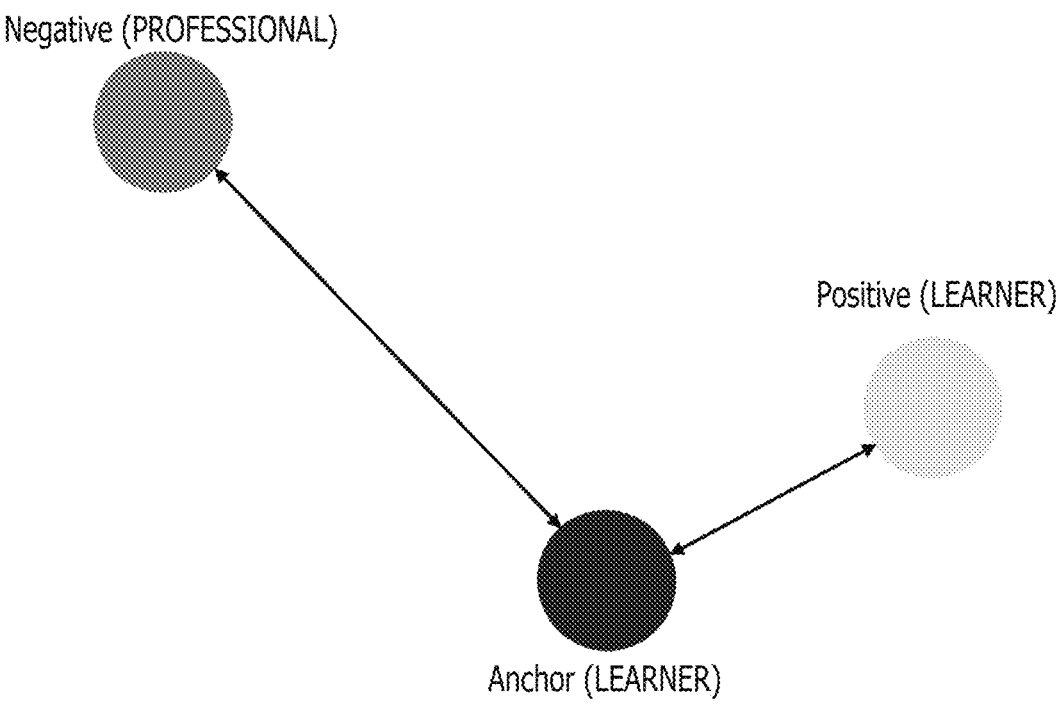

F I G . 1 8
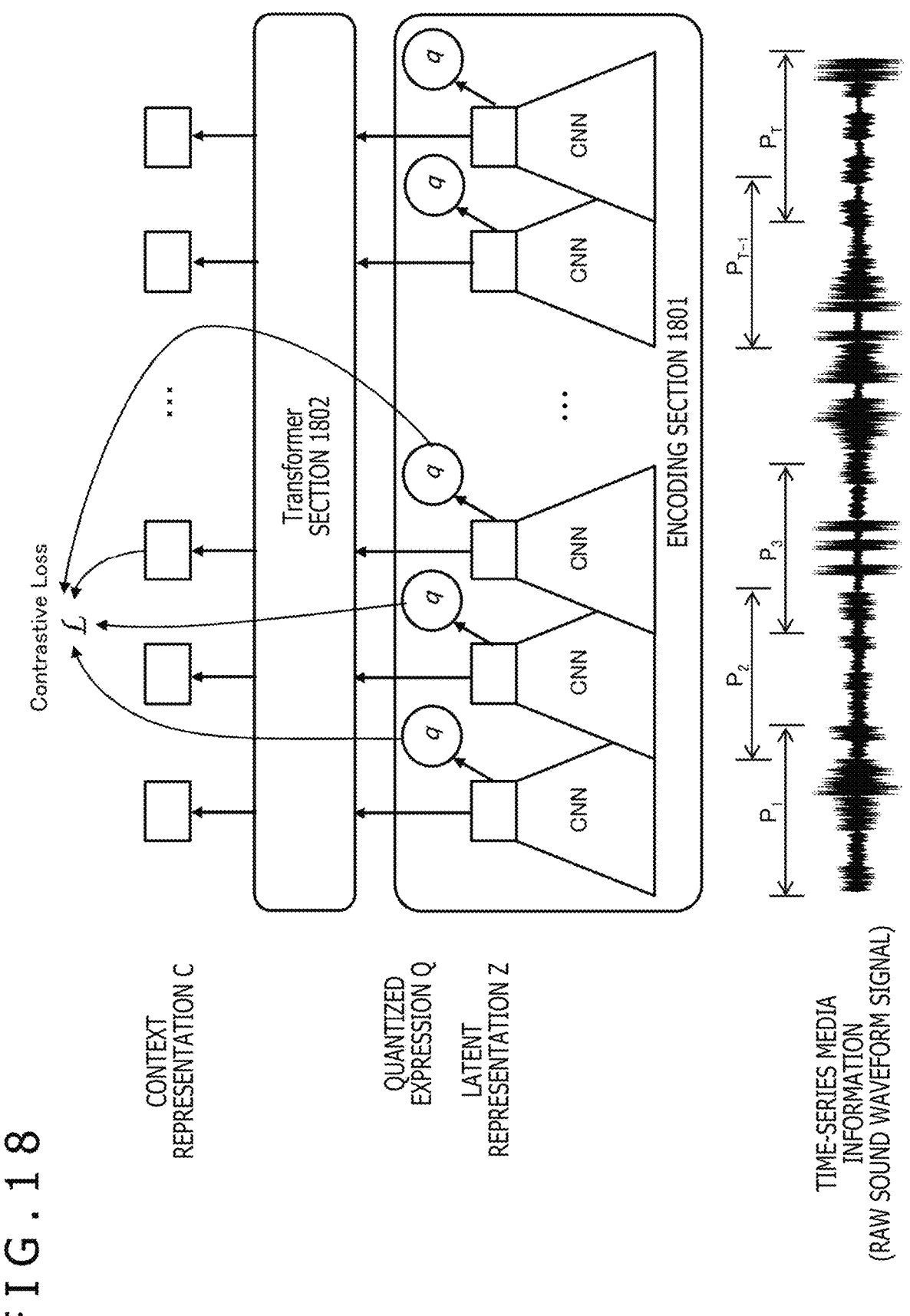

FIG.19

| CONTENTS OF LEARNING | TIME-SERIES MEDIA INFORMATION |
|---|---|
| LANGUAGE LEARNING | SOUND, SENTENCE |
| MUSICAL INSTRUMENT PERFORMANCE | SOUND, VIDEO |
| SPEECH/ADDRESS | SOUND, VIDEO, SENTENCE |
| SPORT | VIDEO |
| COOKING | VIDEO |
| SURGERY/MEDICAL PRACTICE | VIDEO |
| MASSAGE | VIDEO |
| WRITING ACTIVITY (NOVEL, SCREENPLAY, TRANSLATION) | SENTENCE |
| ACTING (ACTOR, STAND-UP COMEDY) | VIDEO, SOUND, SENTENCE |

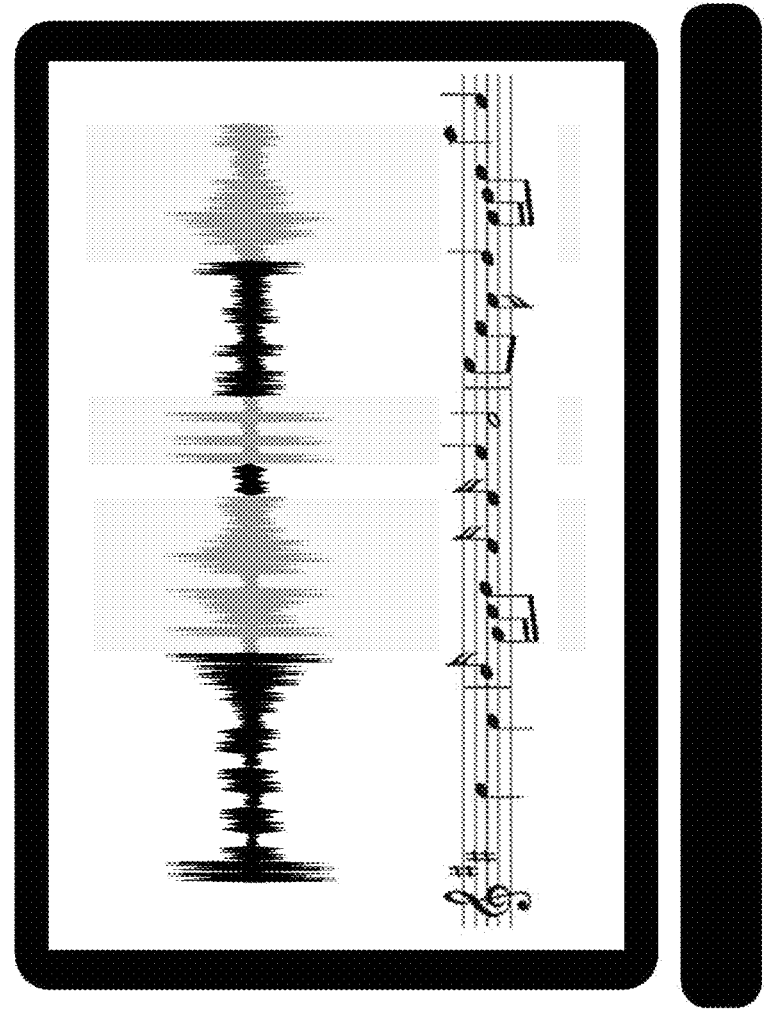
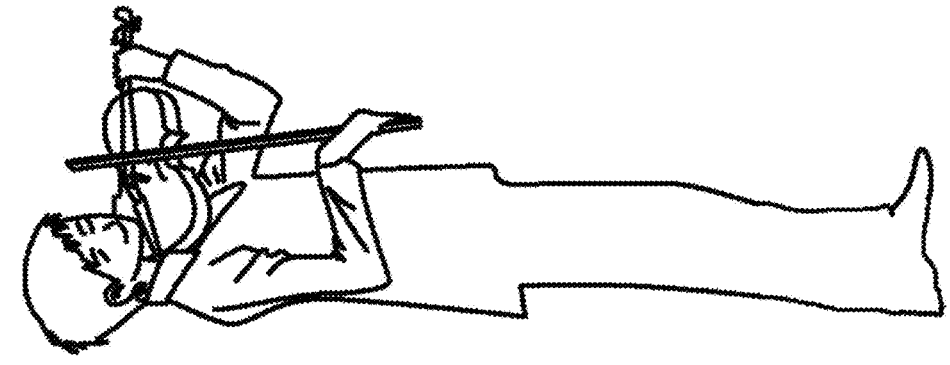
FIG.21

FIG.23

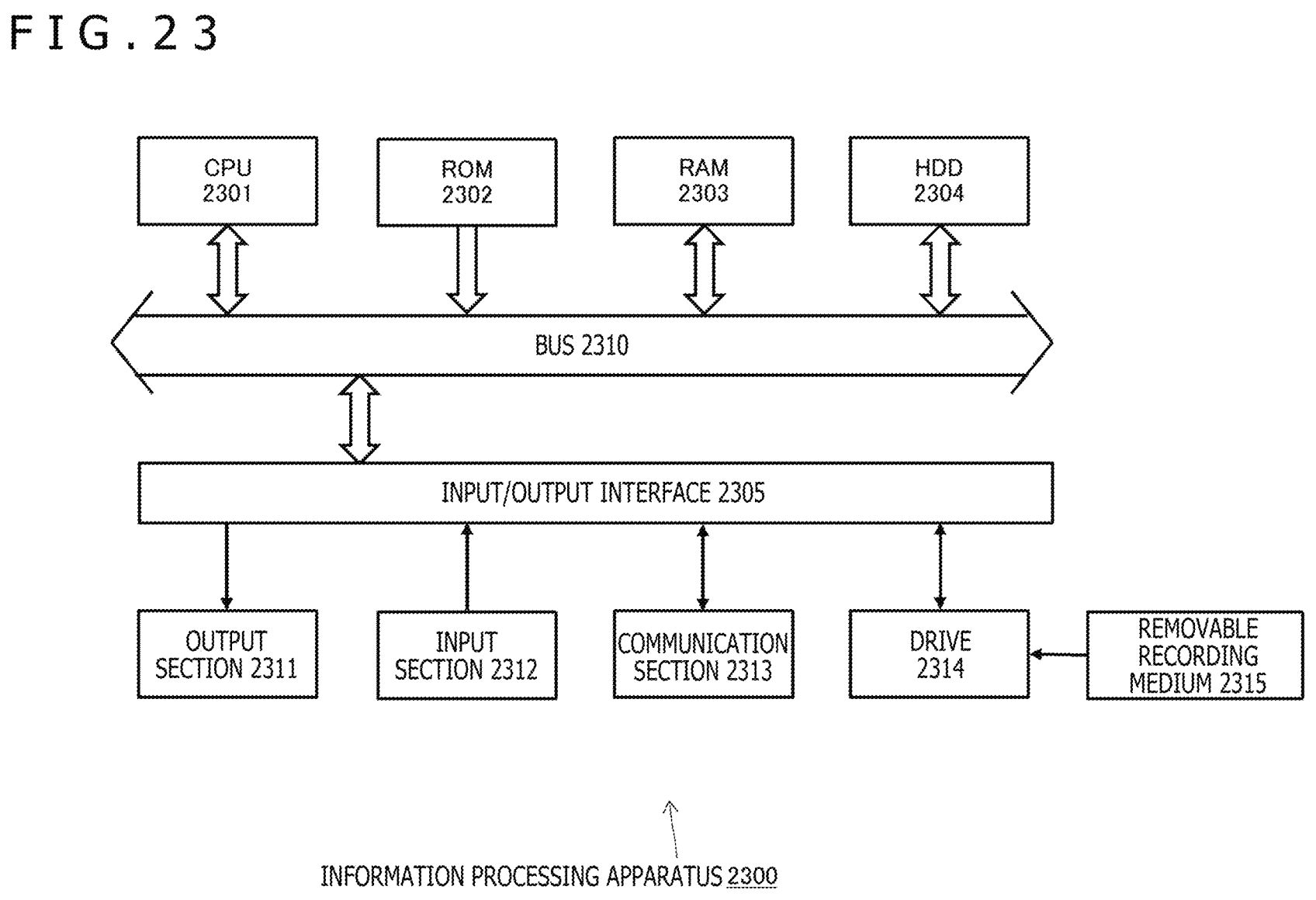

CPU
2301

ROM
2302

RAM
2303

HDD
2304

BUS 2310

INPUT/OUTPUT INTERFACE 2305

OUTPUT
SECTION 2311

INPUT
SECTION 2312

COMMUNICATION
SECTION 2313

DRIVE
2314

REMOVABLE
RECORDING
MEDIUM 2315

INFORMATION PROCESSING APPARATUS 2300

INFORMATION TERMINAL 2400

INFORMATION PROCESSING METHOD, INFORMATION PROCESSING SYSTEM, AND INFORMATION TERMINAL TO ASSIST USER LEARNING

CROSS REFERENCE TO RELATED APPLICATIONS

This application is a U.S. National Phase of International Patent Application No. PCT/JP2021/042119 filed on Nov. 16, 2021, which claims priority benefit of Patent Application No. U.S. 63/139,971 filed in the U.S Patent Office on Jan. 21, 2021. Each of the above-referenced applications is hereby incorporated herein by reference in its entirety.

TECHNICAL FIELD

The technology disclosed in the present specification (hereinafter, called the "present disclosure") relates to an information processing method, an information processing system, an information terminal, and a computer program for performing processes for assisting learning performed by a user.

BACKGROUND ART

In recent years, information technology has been used more often for assisting learning performed by users in language learning, musical instrument learning, training of sports (golf, baseball, soccer, etc.), and the like. For example, there has been a proposed sound learning system to be used when a second language is learned through sounds. In the sound learning system, a level determination program executed by a computer determines a learning level on the basis of sound data based on utterance by a learner, and the reproduction speed of second-language sentences is adjusted such that the reproduction speed matches the level of the learner (see PTL 1). In addition, there has been a proposed information processing apparatus that acquires sensor information representing information related to a first user who is playing golf, from sensor information obtained with use of a sensor attached to a golf club, acquires feedback information which is feedback on first generation information based on the sensor information, from a terminal of a second user, and transmits the feedback information to a terminal of the first user (see PTL 2).

CITATION LIST

Patent Literature

[PTL 1]
Japanese Patent Laid-open No. 2021-113904
[PTL 2]
PCT Patent Publication No. WO2018/220948

SUMMARY

Technical Problem

An object of the present disclosure is to provide an information processing method, an information processing system, an information terminal, and a computer program for performing processes for assisting learning performed by a user.

Solution to Problems

The present disclosure has been made in view of the problems described above, and a first aspect thereof is an information processing method including an input step of inputting time-series media information representing a movement or conduct of a learning user, a first determination step of determining a learning level of the user on the basis of the time-series media information, and an output step of outputting a portion in the time-series media information at which the movement or action by the user is different from a reference movement or action, on the basis of the learning level of the user determined at the first determination step.

Here, in the first determination step, the learning level of the user is determined by using a supervised-trained second machine learning model, after the time-series media information is processed by using a self-trained first machine learning model. In addition, in the first determination step, a ground for determining that the learning level of the user is inadequate or for determining that learning by the user is necessary is determined regarding the time-series media information by using an Attention mechanism incorporated into the second machine learning model.

In the output step, the portion in the time-series media information at which the movement or action by the user is different from the reference movement or action is output to a presenting apparatus. Moreover, the information processing method according to the first aspect further includes a first presentation step of presenting, through the presenting apparatus to the user, the portion in the time-series media information at which the movement or action by the user is different from the reference movement or action. In the first presentation step, the portion in time-series information media at which the movement or action by the user is different from the reference movement or action is visually presented.

In addition, the information processing method according to the first aspect further includes a second determination step of determining distance information representing a difference between the movement or action by the user and the reference movement or action and a second presentation step of outputting a result of the determination in the second determination step to a presenting apparatus and presenting the result to the user. In the second presentation step, distance information is visually presented in an N-dimensional space in which the reference movement or action is arranged at a center.

In addition, a second aspect of the present disclosure is an information processing system including an input section that receives input of time-series media information representing a movement or conduct of a learning user, a first determining section that determines a learning level of the user on the basis of the time-series media information, and an output section that outputs a portion in the time-series media information at which the movement or action by the user is different from a reference movement or action, on the basis of the learning level of the user determined by the first determining section. The information processing system according to the second aspect may further include a sensor section that detects the movement or conduct of the learning user and acquires the time-series media information and a presenting apparatus that is used by the output section to output the portion in the time-series media information at which the movement or action by the user is different from the reference movement or action.

It should be noted that a "system" described here means an object which is a logical set of a plurality of apparatuses (or functional modules that realize particular functionalities), and it does not particularly matter whether or not each apparatus or functional module is in a single housing. That is, one apparatus including a plurality of components or functional modules and a set of a plurality of apparatuses are both equivalent to "systems."

In addition, a third aspect of the present disclosure is an information terminal including a sensor section that detects a movement or conduct of a learning user and acquires time-series media information, a communication section that transmits the time-series media information to an external apparatus and receives, from the external apparatus, results of determinations regarding a learning level of the user and a portion in the time-series media information at which the movement or action by the user is different from a reference movement or action, and a presenting section that presents received information.

In addition, a fourth aspect of the present disclosure is a computer program written in a computer-readable format such that a computer functions as an input section that receives input of time-series media information representing a movement or conduct of a learning user, a first determining section that determines a learning level of the user on the basis of the time-series media information, and an output section that outputs a portion in the time-series media information at which the movement or action by the user is different from a reference movement or action, on the basis of the learning level of the user determined by the first determining section.

The computer program according to the fourth aspect of the present disclosure defines a computer program written in a computer-readable format such that predetermined processes are realized on the computer. Stated differently, by installing the computer program according to the fourth aspect of the present disclosure on the computer, cooperative effects are exhibited on the computer, and effects and advantages similar to those of the information processing method according to the first aspect of the present disclosure can be attained.

Advantageous Effects of Invention

The present disclosure can provide an information processing method, an information processing system, an information terminal, and a computer program for performing processes for determining a learning level of a user or presenting the determined learning level.

Note that advantages described in the present specification are illustrated merely as examples, and advantages provided by the present disclosure are not limited to them. In addition, the present disclosure attains further additional advantages other than the advantages described above, in some cases.

Still other objects, features, and merits of the present disclosure will become apparent from more detailed explanations based on an embodiment and attached drawings described later.

BRIEF DESCRIPTION OF DRAWINGS

FIG. 2 is a flowchart depicting an operation example of the information processing system 100.

FIG. 3 is a flowchart depicting another operation example of the information processing system 100.

FIG. 4 is a diagram depicting an example in which a determination result visually is presented.

FIG. 16 is a diagram for explaining a method of computation of Triplet Loss.

FIG. 18 is a diagram for explaining a self-training method of a self-training model 1701.

FIG. 19 is a diagram depicting a relation between the contents of learning that can be assisted by the present disclosure and types of time-series media information.

FIG. 21 is a diagram depicting a configuration example of a UI that presents a result of a determination regarding a learning level of a user to the user.

FIG. 23 is a diagram depicting a configuration example of an information processing apparatus 2300.

DESCRIPTION OF EMBODIMENT

Figure 1:
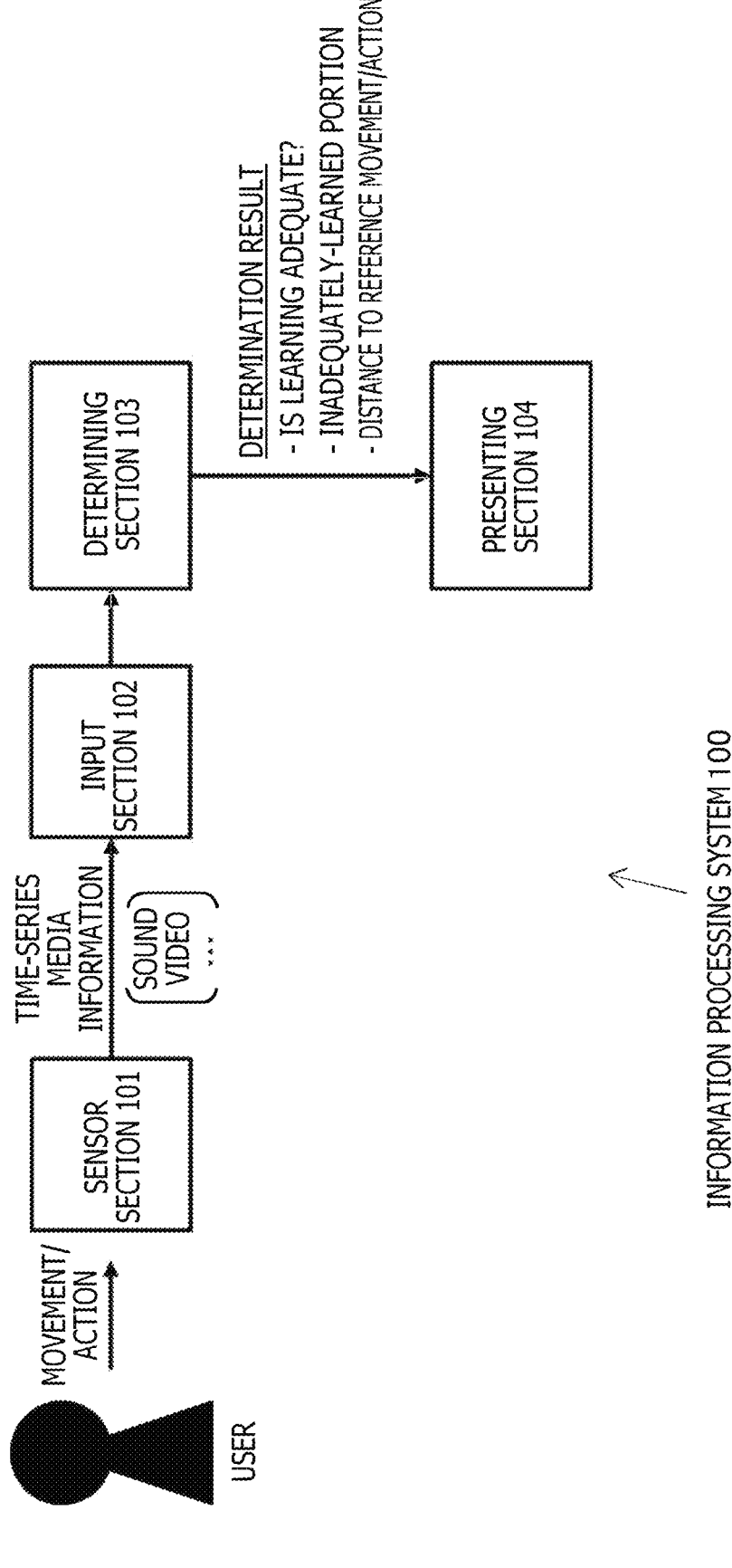
FIG. 1 is a diagram depicting the basic configuration of an information processing system 100 that assists learning performed by a user.

The present disclosure is explained below in the following order with reference to the drawings.
A. Overview
B. Basic Configuration
  B-1. Functional Blocks
  B-2. System Operation
  B-3. Determination Result Presentation Method
  B-4. Specific System Configuration Examples
  B-5. Presentation of Distance Information
C. Implementation Using Machine Learning Models
  C-1. Configurations of Machine Learning Models
  C-2. Training Methods
D. Application Examples
E. UI Examples
F. Apparatus Configuration Examples F-1. Configuration Example of Information Processing
   Apparatus F-2. Configuration Example of Information Terminal

A. Overview

In recent years, information technology has been used more often for assisting learning performed by users in language learning, musical instrument learning, training of sports (golf, baseball, soccer, etc.), and the like. For example, a level determination regarding a learner can be performed by using a computer (see PTL 1). However, simply presenting a level representing the progress of learning cannot be said to be adequate as feedback to a user. That is, it is difficult for a user to find out future challenges by simply knowing her/his level, and the user cannot recognize a portion that is different from a model to emulate and how much different that portion is from the model to emulate.

In view of this, the present disclosure proposes a method for determining a learning level of a user regarding a movement or action performed by the user, in time-series media information such as a video or sound representing the movement or action, presenting a result of the determination to the user, and, in a case where the result of the determination indicates that the learning is inadequate yet, further presenting learning progress information representing which portion in the movement or action by the user is inadequately-learned and how much inadequately-learned that portion is. In addition, the present disclosure proposes an apparatus for realizing the method.

Note that it is supposed in the present specification that a user refers to a "learner" who is trying to master a language, a musical instrument, a sport, or the like, unless otherwise particularly described.

In a case where a user tries to master, for example, a second language, she/he learns to make sounds uttered by or sentences written by her/him closer to pronunciations made by or sentences written by a native speaker. The method according to the present disclosure can present, to the user, a result of a determination as to whether or not sounds uttered by or sentences written by the user are close to those by a native speaker. Further, the present disclosure can visually present information as to which portion in the sounds uttered by or the sentences written by the user is different from those by a native speaker and how much different that portion is. Accordingly, when the user tries to master the second language, it becomes possible for the user to understand differences between current pronunciations or sentences of her/himself and pronunciations or sentences that she/he should aim for, and efficiently train to master the language even if there are no native speakers, private tutors, or the like (i.e., even if she/he is learning on her/his own). Needless to say, the present disclosure can be applied not only to language learning, but also to occasions where users try to master various movements or actions that involve sound generation such as those seen when the users engage in singing or musical instrument performance, deliver addresses, engage in acting, or perform stand-up comedy.

In addition, users train to make their physical movements (swings, running kicks, waza, ukemi, etc.) close to those by professional players or trainers, in a case where the users try to master sports (ball games such as golf, tennis, soccer, or baseball, martial arts such as judo, karate, kendo, or boxing). The method according to the present disclosure can present, to a user, a result of a determination as to whether or not a physical movement of the user is close to a physical movement by a professional player or a trainer, the determination being based on a video capturing images of the user in training or in a play, and visually present information as to which portion in the physical movement of the user is different from the movement by the professional player or instruction contents of the trainer and how much different that portion is. Accordingly, when sports training is performed, it becomes possible for the user to understand the differences between the her/his current physical movement and the physical movement that she/he should aim for, and perform the training efficiently even if there are no professional players, trainers, or the like around her/him. Needless to say, the present disclosure can be applied not only to sports, but also to occasions where users try to master various physical movements such as those seen when the users engage in musical instrument performance, practice calligraphy, do cooking, deliver addresses, engage in acting, or perform stand-up comedy or sketches.

B. Basic Configuration

B-1. Functional Blocks

FIG. 1 schematically depicts the basic configuration of an information processing system 100 to which the present disclosure is applied and which assists learning performed by a user.

A sensor section 101 includes an image sensor such as a camera and a sound sensor such as a microphone that detect a video, a sound, and the like representing a movement or action performed by the user. The sensor section 101 outputs time-series media information such as the video or sound representing the movement or action performed by the user.

A determining section 103 receives, from the sensor section 103 via an input section 102, input of the time-series media information such as the video or sound representing the movement or action performed by the user. Then, the determining section 103 determines, in the time-series media information, a learning level of the movement or action performed by the user, and presents a result of the determination to the user. For example, in a case where the user tries to master conversation in a second language, the determining section 103 determines whether or not sounds uttered by the user are close to those by a native speaker, that is, whether the pronunciation by the user is at the level of native speakers and no further learning is necessary or whether or not the pronunciation by the user is different from that by a native speaker and, accordingly, the learning needs to be continued, and outputs a result of the determination as to whether the learning is necessary or unnecessary. In addition, in a case of determining that the user needs to continue the learning, the determining section 103 determines which portion in the time-series media information is inadequately-learned and how much inadequately-learned that portion is, and outputs a result of the determination. The determining section 103 performs a process of determining a learning level of the user by using trained machine learning models, and this is described later in detail.

A presenting section 104 presents, to the user, the results that are output from the determining section 103 and are the result of the determination as to whether the learning by the user is necessary or unnecessary. The presenting section 104 also presents, to the user, a portion that is in the time-series media information that is determined as inadequately-learned (n.b., in a case where it is determined that the user needs to continue the learning). The presenting section 104 includes a display that visually presents results of determinations made by the determining section 103, and may further include a sound output device such as a speaker in order to be able to present information also as sound announcements. In particular, if a relevant portion in the time-series media information is visually presented on a display screen, the user can easily understand which portion of her/his movement or action is inadequately-learned and how much inadequately-learned that portion is.

B-2. System Operation

FIG. 2 depicts one operation example of the information processing system 100 in a flowchart format. Activation of this operation is triggered by, for example, a learning user giving an instruction to make a determination regarding a learning level.

The sensor section 101 detects, by using the image sensor or sound sensor, a video or sound representing a movement or action performed by the learning user, and outputs the video or sound as time-series media information (Step S201).

The determining section 103 receives input of the time-series media information via the input section 102, and determines a learning level of the movement or action performed by the user (Step S202). In addition, in a case where there is an inadequately-learned portion, in Step S202, the determining section 103 determines which portion in the time-series media information is inadequately-learned and how much inadequately-learned that portion is. The determining section 103 performs the process of determining the learning level of the user on the basis of the time-series media information by using trained machine learning models. Then, if the movement or action by the user is close to a reference movement or action, the determining section 103 determines that the learning by the user is adequate (Yes in Step S203), but if the movement or action by the user is not close to the reference movement or action, the determining section 103 determines that the learning by the user is inadequate (No in Step S203).

For example, in a case where the present disclosure is applied to mastering of a second language, the determining section 103 determines that the learning by the user is adequate if sounds or sentences uttered by the user are at the level of native speakers, but otherwise determines that the learning by the user is inadequate. In addition, in a case where the present disclosure is applied to training of a sport, the determining section 103 determines that the learning by the user is inadequate if physical movements by the user are close to motions of a professional player or a trainer.

In a case where the determining section 103 determines that the learning by the user is adequate (Yes in Step S203), the determining section 103 presents, through the presenting section 104 to the user, the result of the determination that the learning is adequate or that the learning is to be ended (Step S204), and the present process is ended. In addition, even in a case of determining that the learning by the user is adequate, the determining section 103 may present an inadequately-learned portion in the time-series media information if there is a partially inadequately-learned portion, and may allow the learning to be continued if the user wishes.

On the other hand, in a case where the determining section 103 determines that the learning by the user is inadequate (No in Step S203), the determining section 103 presents, through the presenting section 104 to the user, the result of the determination that the learning is inadequate or that the learning is to be continued (Step S205), and presents an inadequately-learned portion in the time-series media information (Step S206), and the present process is ended.

FIG. 3 depicts another operation example of the information processing system 100 in a flowchart format. Activation of this operation is triggered by, for example, a learning user giving an instruction to make a determination regarding a learning level.

The sensor section 101 detects, by using the image sensor or sound sensor, a video or sound representing a movement or action performed by the learning user, and outputs the video or sound as time-series media information (Step S301). Then, the determining section 103 receives input of the time-series media information via the input section 102, and determines a learning level of the movement or action performed by the user (Step S302). In addition, in a case where there is an inadequately-learned portion, in Step S302, the determining section 103 determines which portion in the time-series media information is inadequately-learned and how much inadequately-learned that portion is.

Here, in a case where the determining section 103 determines that the learning by the user is adequate (Yes in Step S303), the determining section 103 presents, through the presenting section 104 to the user, the result of the determination that the learning is adequate or that the learning is to be ended (Step S304), and the present process is ended. In addition, even in a case where of determining that the learning by the user is adequate, the determining section 103 may present an inadequately-learned portion in the time-series media information if there is a partially inadequately-learned portion, and may allow the learning to be continued if the user wishes.

On the other hand, in a case where the determining section 103 determines that the learning by the user is inadequate (No in Step S303), the determining section 103 presents, through the presenting section 104 to the user, the result of the determination that the learning is inadequate or that the learning is to be continued (Step S305), and presents an inadequately-learned portion in the time-series media information (Step S306). Thereafter, the present process returns to Step S301, and the learning performed by the user and the detection of and determinations regarding time-series media information representing a movement or action by the learning user are repetitively executed until it is determined that the learning by the user is adequate (Yes in Step S303).

B-3. Determination Result Presentation Method

FIG. 4 depicts an example in which the presenting section 104 visually presents information as to which portions in time-series media information are inadequately-learned and how much inadequately-learned those portions are. It is supposed in an example here that, when a user tries to learn pronunciations of English, a sound waveform signal generated when the user utters the phrase, "This was easy for us," is input to the system 100 as time-series media information. Note that the phrase, "This was easy for us," may be what is read out by the user when an English learning program presents the phrase on a screen or may be what is uttered freely by the user, for example.

In a case where it is determined that the phrase, "This was easy for us," uttered by the user is different from that by a native speaker and there are portions at which learning by the user is inadequate, the determining section 103 determines which portions in the sound waveform signal are inadequately-learned and how much inadequately-learned those portions are. Then, as depicted in FIG. 4, the presenting section 104 highlights portions in the sound waveform signal at which the sound waveform signal is different from a sound waveform signal of the native speaker. In addition, as depicted in FIG. 4, along with the sound waveform signal, the presenting section 104 displays, as text, the phrase, "This was easy for us," uttered by the user, and highlights words or character strings "This," "eas," and "for" determined as being pronounced differently from pronunciations made by a native speaker. Note that the method of highlighting is not particularly limited to any method. For example, other than displaying relevant words or character strings with a high luminance (or in addition to displaying the relevant words or strings with a high luminance), other possible methods include increasing font sizes, displaying the relevant words or character strings with thick letters, changing fonts, encircling letters, and so on.

Accordingly, it becomes easier for the user to not only simply recognize that her/his pronunciation is different from that by a native speaker, but also to understand portions (words or character strings) at which her/his pronunciation is different from that by the native speaker. Then, the user can efficiently perform language learning by intensively learning the portions in the same phrase that are pointed out, "This," "eas," and "for," by correcting, with particular care, pronunciations of the portions that are pointed out, for example.

Figure 5:
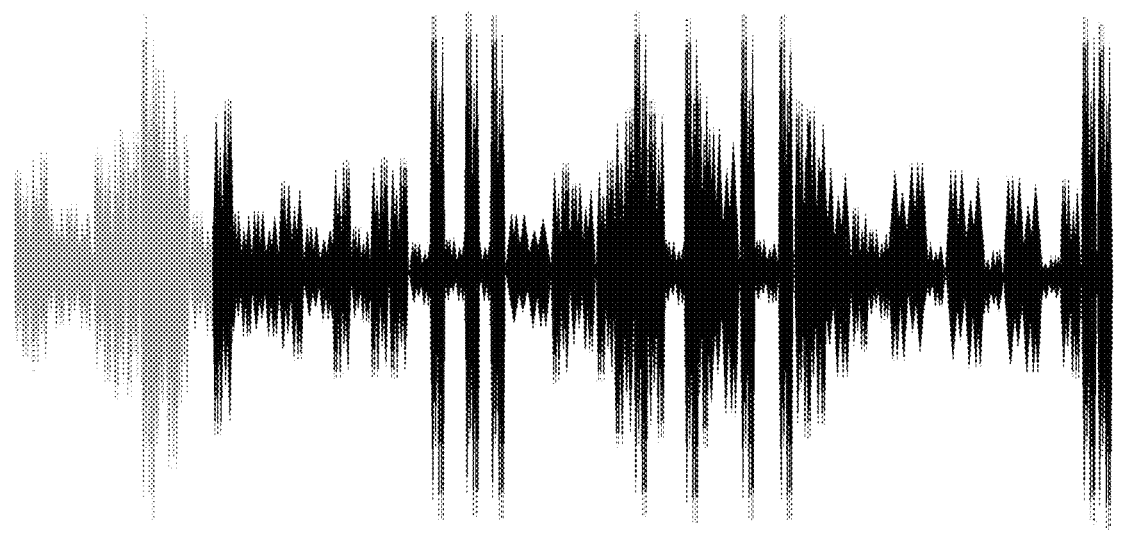
FIG. 5 is a diagram depicting an example in which a determination result is visually presented.
Figure 6:
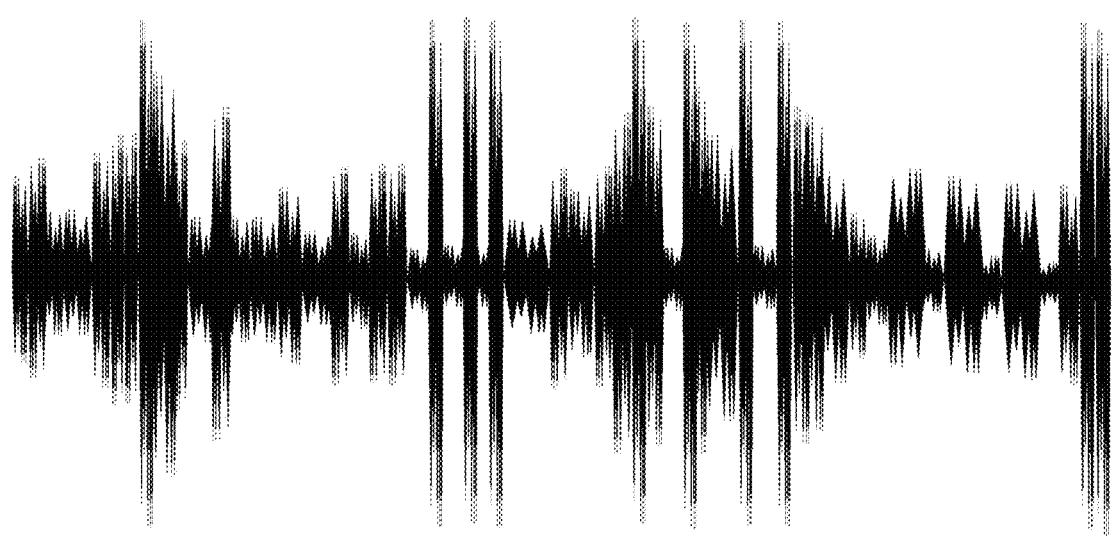
FIG. 6 is a diagram depicting an example in which a determination result is visually presented.

FIG. 5 and FIG. 6 each depict a visual presentation example representing a case where detection of and determinations regarding time-series media information are repetitively executed until it is determined that learning by a user is adequate, as in the operation example depicted in FIG. 3.

On the basis of visual presentation as the one depicted in FIG. 4, the user pronounces the phrase, "This was easy for us," with particular care to the words or character strings "This," "eas," and "for," that are pointed out as differences from pronunciations made by a native speaker. It is supposed that, as a result, the pronunciations by the user are improved and the determining section 103 determines that only the portion of the word, "This," is different from the pronunciation by the native speaker. In this case, as depicted in FIG. 5, the presenting section 104 highlights the portion relevant to the word, "This," in an input sound waveform signal, and highlights only the word, "This," in the text display of the phrase, "This was easy for us."

Accordingly, the user can understand that her/his pronunciations have become closer to those by the native speaker than the previous pronunciations, and that she/he should pronounce the word, "This," with particular care next time. As a result, the pronunciation by the user are further improved, and it becomes possible for the user to pronounce the entire phrase, "This was easy for us," at the level of native speakers. As a result, the determining section 103 can determine that the learning is adequate and end the learning of the pronunciation of the phrase, "This was easy for us." In addition, as depicted in FIG. 6, the presenting section 104 no longer presents any portion, in the input sound waveform signal and the text display of the phrase, "This was easy for us," at which the sound waveform signal is different from that of the native speaker.

Note that, although omitted in FIG. 4 to FIG. 6, not only an inadequately-learned portion in the time-series media information (e.g., a portion of the sound waveform signal at which the sound waveform signal is different from that of the native speaker) is highlighted, but also how much inadequately-learned that portion is or a ground for determining that portion as inadequately-learned may be numerically expressed and presented together. Further, the levels of highlight may be adjusted according to the numerical values of the grounds (e.g., as the numerical values increase, the luminance is increased and/or the font sizes are increased). In addition, an explanation regarding a specific method for improvement, such as "'this' is pronounced as 'zis.' Pronounce the sound of 'th' by sandwiching the tip of the tongue with the upper and lower teeth." may be displayed as a pop-up message on the screen, a video presenting the motion of a mouth may be reproduced, and sound guidance may be output, for example. If the level of learning is expressed visually in this manner, it becomes possible for the user to understand a portion that requires intensive learning.

B-4. Specific System Configuration Examples

Figure 7:
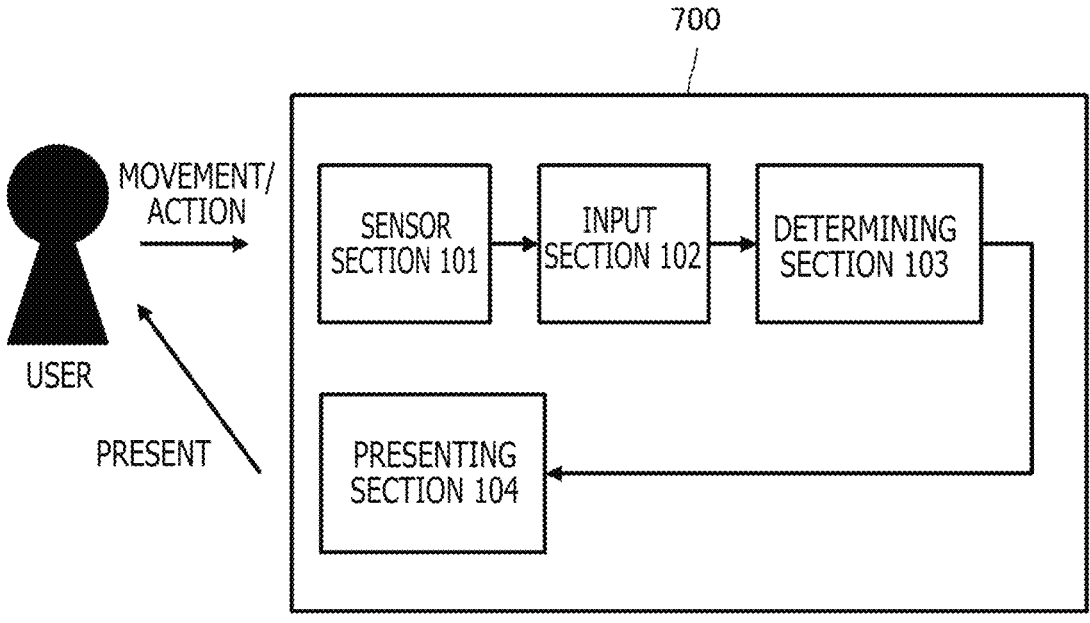
FIG. 7 is a diagram depicting a system configuration example.

FIG. 7 depicts a system configuration example in which all of the sensor section 101, the input section 102, the determining section 103, and the presenting section 104 are mounted on a single apparatus 700. The single apparatus 700 described here may be, for example, a multifunctional information terminal such as a smartphone or a tablet, a personal computer, or a device fabricated specifically for learning assistance, the multifunctional information terminal, the personal computer, or the device being carried by a user. It should be noted that, in other possible configurations, some of sections of the apparatus 700, such as the sensor section 101 and/or the presenting section 104, may not be built in an apparatus 500, but may be externally connected to the apparatus 700. For example, a wired interface such as a USB (Universal Serial Bus) or an HDMI (registered trademark) (High Definition Multimedia Interface) or a wireless interface such as a Bluetooth (registered trademark) or Wi-Fi (registered trademark) interface can be used to externally connect some constituent elements to the apparatus 500.

Figure 8:
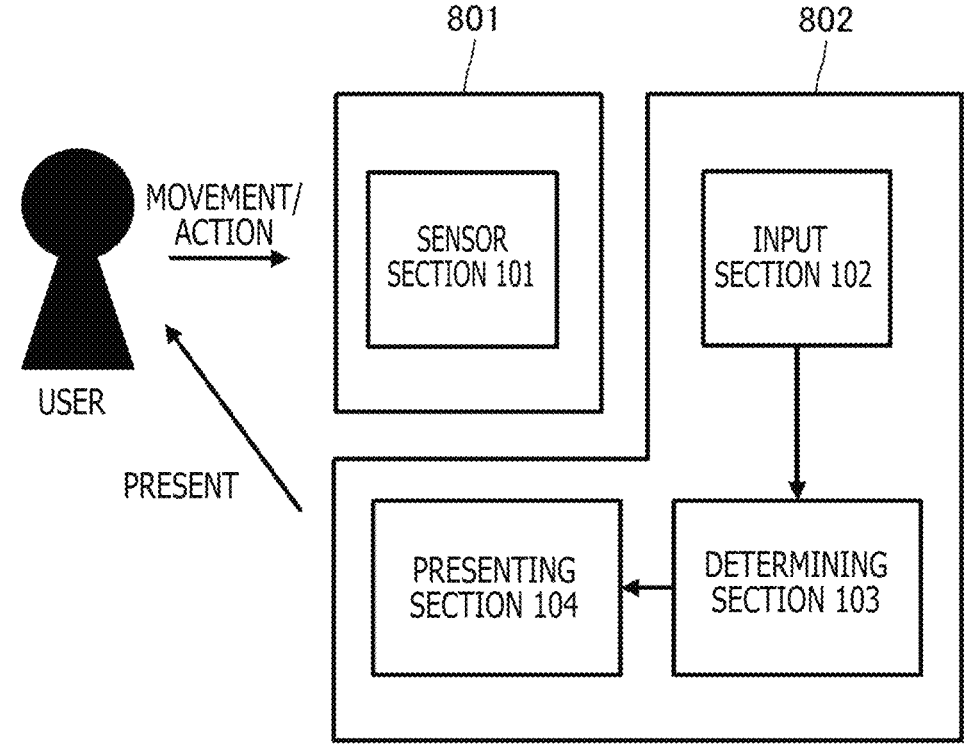
FIG. 8 is a diagram depicting another system configuration example.

FIG. 8 depicts a system configuration example in which a first apparatus 801 on which the sensor section 101 is mounted and a second apparatus 802 including the input section 102, the determining section 103, and the presenting section 104 are separated from each other. The first apparatus 801 and the second apparatus 802 are interconnected via a wireless or wired interface. The first apparatus 801 includes a camera, a microphone, or the like installed at a location where movements or actions performed by a learning user can easily be detected. A sensor attached to a tool used by a user for sport competition, such as a swing sensor attached to a golf club, may be the first apparatus 801. Meanwhile, the second apparatus 802 is a multifunctional information terminal, a personal computer, or the like such as a smartphone or a tablet carried by a user, for example. The second apparatus 802 determines a learning level of the user and which portion in a movement or action by the user is inadequately-learned and how much inadequately-learned that portion is, on the basis of time-series information acquired from the first apparatus 801 via the wireless or wired interface, and visually presents a result of the determination.

Figure 9:
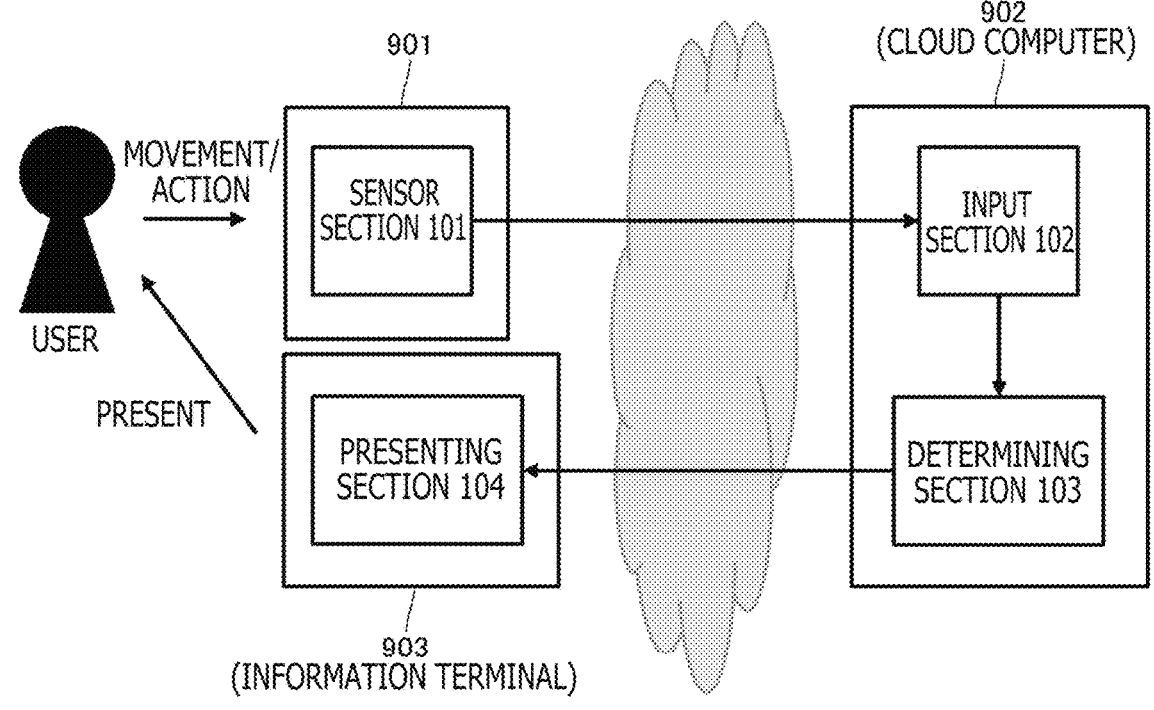
FIG. 9 is a diagram depicting still another system configuration example.

FIG. 9 depicts a system configuration example in which a first apparatus 901 on which the sensor section 101 is mounted, a second apparatus 902 on which the input section 102 and the determining section 103 are mounted, and a third apparatus 903 on which the presenting section 104 is mounted are separated from each other. The first apparatus 901 includes a camera, a microphone, or the like installed at a location where movements or actions performed by a learning user can easily be detected. A sensor attached to a tool used by a user for sport competition, such as a swing sensor attached to a golf club, may be the first apparatus 901. The second apparatus 902 includes an apparatus having a high computational capability, such as a personal computer or a cloud computer. The third apparatus 903 includes a multifunctional information terminal or the like such as a smartphone or a tablet carried by a user, for example, and mainly performs only a process of receiving determination results from the second apparatus 902 and presenting the determination results to the user. In a case where the second apparatus 902 is a cloud computer, the system can be configured such that learning-level determination processing services are provided to a plurality of or a lot of users.

Figure 10:
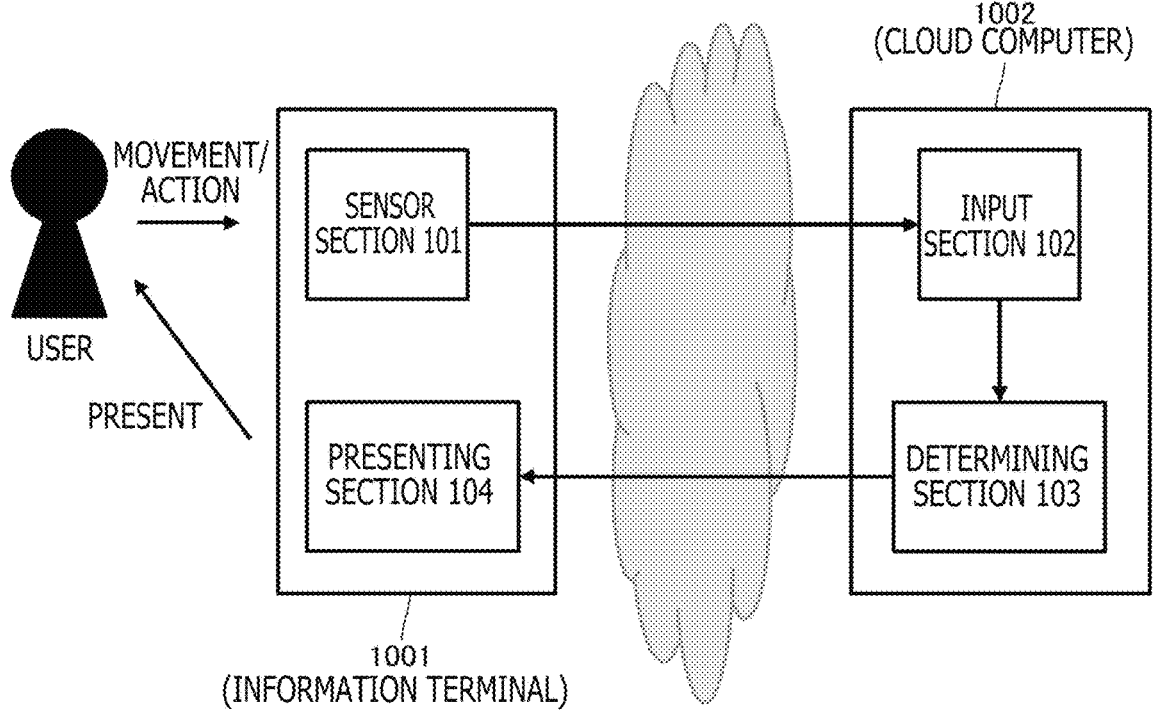
FIG. 10 is a diagram depicting yet another system configuration example.

FIG. 10 depicts a system configuration example in which a first apparatus 1001 on which the sensor section 101 and the presenting section 104 are mounted and a second apparatus 1002 on which the input section 102 and the determining section 103 are mounted are separated from each other. The first apparatus 1001 includes a multifunctional information terminal, a personal computer, or the like such as a smartphone or a tablet carried by a user, for example. The sensor section 101 may be configured as a sensor section not built in the first apparatus 1001, but externally connected to the first apparatus 1001. Meanwhile, the second apparatus 1002 is a cloud computer, for example. The second apparatus 1002 receives time-series media information from the first apparatus 1001, and sends back a determination result regarding a learning level of a user based on the time-series media information to the first apparatus 1001. Accordingly, the first apparatus 1001 acquires time-series media information from a learning user, transmits (uploads) the time-series media information to the second apparatus 1002, receives (downloads) a determination result regarding the time-series media information from the second apparatus 1002, and presents the determination result to the user. In a case where the second apparatus 1002 is a cloud computer, the system can be configured such that learning-level determination processing services are provided to a plurality of or a lot of users.

B-5. Presentation of Distance Information

In explanations given thus far, the determining section 103 determines a learning level of a user on the basis of time-series media information such as a video or sound representing a movement or action performed by the user, and, in a case where there is such a portion of an inadequate learning level, determines which portion in the time-series media information is inadequately-learned and how much inadequately-learned that portion is, and the presenting section 104 presents results of the determinations to the user. As a developed form, the determining section 103 may determine, as N-dimensional (two-dimensional or three-dimensional) distance information, how much different the entire movement or action performed by a user is from a reference movement or action (specifically, an ideal movement or action performed by a native speaker, a professional player, a trainer, or the like), and the presenting section 104 may present the N-dimensional distance information. The determining section 103 can determine the distance information by using a distance learning model, and this is described later in detail.

Figure 11:
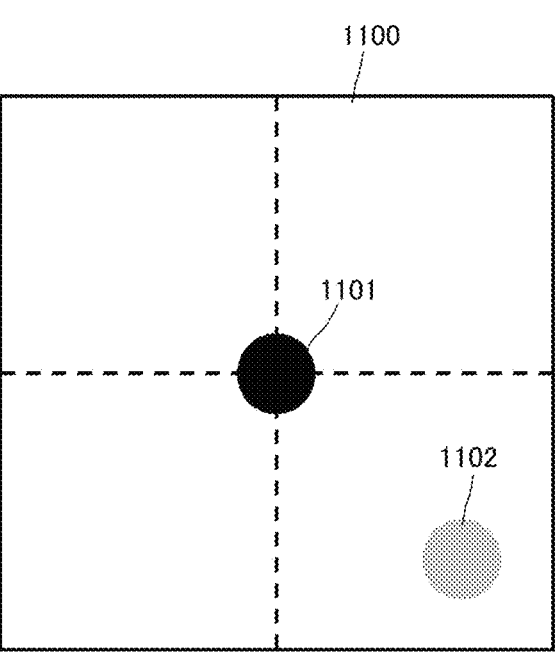
FIG. 11 is a diagram depicting an example in which distance information representing a difference between a movement or action by a user and a reference movement or action is presented on a two-dimensional plane.

FIG. 11 depicts an example in which a difference between a movement or action by a user and a reference movement or action is expressed as distance information on a two-dimensional plane and the presenting section 104 presents the distance information. In the example depicted in FIG. 11, a figure 1101 representing the reference movement or action is displayed at the center of a two-dimensional plane 1100, and a figure 1102 representing the movement or action performed by the user is displayed at a location apart from the center. In a case where the user tries to learn a pronunciation of a second language, the figure 1101 at the center represents a pronunciation made by a native speaker, and the figure 1102 displayed around the center represents a current pronunciation made by the user. The distance from the center to the position where the figure 1102 is arranged represents the current pronunciation level of the user. In addition, in a case where a user does training for her/his bat swing of baseball, the figure 1101 at the center represents an ideal bat swing (or a bat swing by a professional baseball player), and the figure 1102 displayed around the center represents a current bat swing by the user. The distance from the center to the position where the figure 1102 is arranged represents the current bat swing skill of the user. In addition, in a case where a user does training for her/his golf swing, the figure 1101 at the center represents an ideal golf swing (or a golf swing by a professional golfer), and the figure 1102 displayed around the center represents a current golf swing of the user. The distance from the center to the position where the figure 1102 is arranged represents the current golf skill of the user.

Figures 12A, 12B, 12C, 12D, 12E:
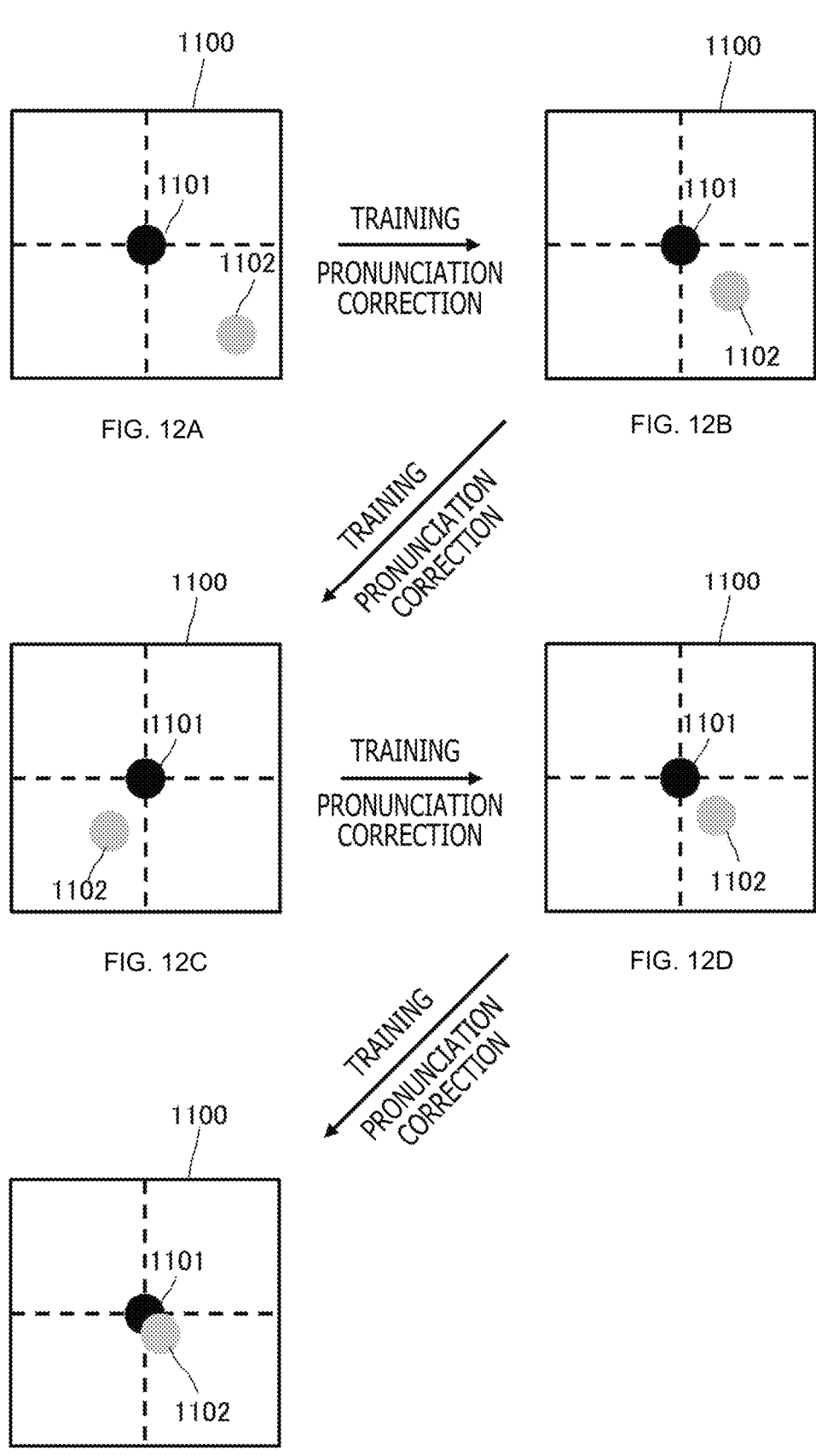
FIGS. 12A, 12B, 12C, 12D, and 12E are diagrams depicting how it appears when distance information changes along with the progress of learning.

FIGS. 12A, 12B, 12C, 12D, and 12E depict how it appears when distance information changes on the two-dimensional plane 1100 along with the progress of learning by a user. At the initial stage of learning, the figure 1102 representing the current learning level of the user is significantly apart from a figure 901 at the center of a two-dimensional plane 900 as depicted in FIG. 12A. Thereafter, as the user continues learning (e.g., corrects the pronunciation), the figure 1102 representing the current learning level of the user gradually approaches the figure 1101 at the center as depicted in FIGS. 12B, 12C, and 12D. In the course of training, the azimuth of the figure 1102 relative to the figure 1101 at the center changes. This represents, for example, a phenomenon in which a portion in time-series media information at which a movement or action by the user is different from a reference movement or action changes between those instances, for example. Then, as the learning is continued, the figure 1102 further approaches the figure 1101 at the center while changing its azimuth, and the figure 1102 eventually overlaps the figure 1101 as depicted in FIG. 12E. This represents that differences between movement or actions by the user and the reference movement or action have decreased adequately and the learning has been completed.

On the basis of visual presentation of distance information as the one depicted in FIG. 11, a user can understand whether her/his movement or action is close to or far different from a reference movement or action. In addition, by visually observing changes in distance information in the course of training as the ones depicted in FIGS. 12A, 12B, 12C, 12D, and 12E, a user can decide whether or not her/his movements or actions are being improved owing to training, that is, whether the direction of the training is right, on her/his own without help from a trainer or the like.

In addition, when it is determined that, on the basis of visual presentation of distance information as the one depicted in FIG. 11, her/his movement or action is far different from the reference movement or action, a user can check a portion in time-series media information at which a movement or action by the user is different from a reference movement or action, by using visual presentation as the ones depicted in FIG. 4 to FIG. 6, understand why her/his movement or action is different from the ideal movement or action, and use the understanding as reference for a future training method.

Figure 13:
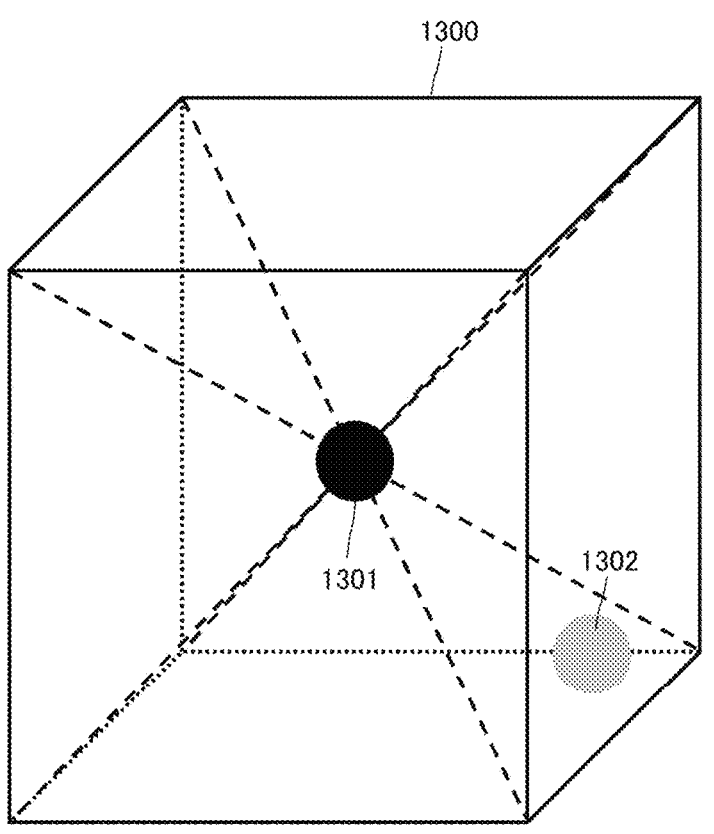
FIG. 13 is a diagram depicting an example in which distance information representing a difference between a movement or action by a user and a reference movement or action is presented on a three-dimensional space.

Note that, whereas FIGS. 11, 12A, 12B, 12C, 12D, and 12E depict examples in which distance information is expressed on the two-dimensional plane 1100, distance information may be expressed in a three-dimensional space as depicted in FIG. 13. In the example depicted in FIG. 13, a figure 1301 representing a reference movement or action is displayed at the center of a three-dimensional space 1300, and a figure 1302 representing a movement or action by a user is displayed at a location apart from the center. Whereas FIGS. 12A, 12B, 12C, 12D, and 12E depict how it appears when the distance information changes on the two-dimensional plane 1100 along with the progress of the learning by the user, changes of distance information along with the progress of learning by a user can be depicted with richer expressiveness by using the three-dimensional space 1300, as depicted in FIG. 13.

C. Implementation Using Machine Learning Models

C-1. Configurations of Machine Learning Models

Item B described above explains that the determining section 103 has functionalities of determining a learning level of a learning user on the basis of time-series media information representing a movement or action performed by the user and determining a portion in the time-series media information at which the movement or action performed by the user is different from a reference movement or action. Such functionalities in the determining section 103 can be realized with use of trained machine learning models such as a DNN (Deep Neural Network), for example.

A classification model using machine learning, such as a DNN, typically includes a feature extracting section that extracts feature quantities from input data such as time-series media information and a classifying section that classifies output labels on the basis of the extracted feature quantities. In the present embodiment, the classifying section classifies learning by a user into a label of either adequate learning or inadequate learning. Specifically, the feature extracting section includes a CNN (Convolutional Neural Network), for example, and the classifying section includes an affine layer. In addition, by incorporating an Attention mechanism into the classifying section, a portion which serves as a ground for labelling learning by a user as inadequate learning can be pointed out on the time-series media information. Note that Attention is one of implementation methods of the XAI (eXplainable AI) technology for explaining a ground for decisions by machine learning models, and is well-known in the art as a technique for incorporating mechanisms for pointing out points of interest in input data (i.e., Attention mechanisms) into the machine learning models.

Figure 14:
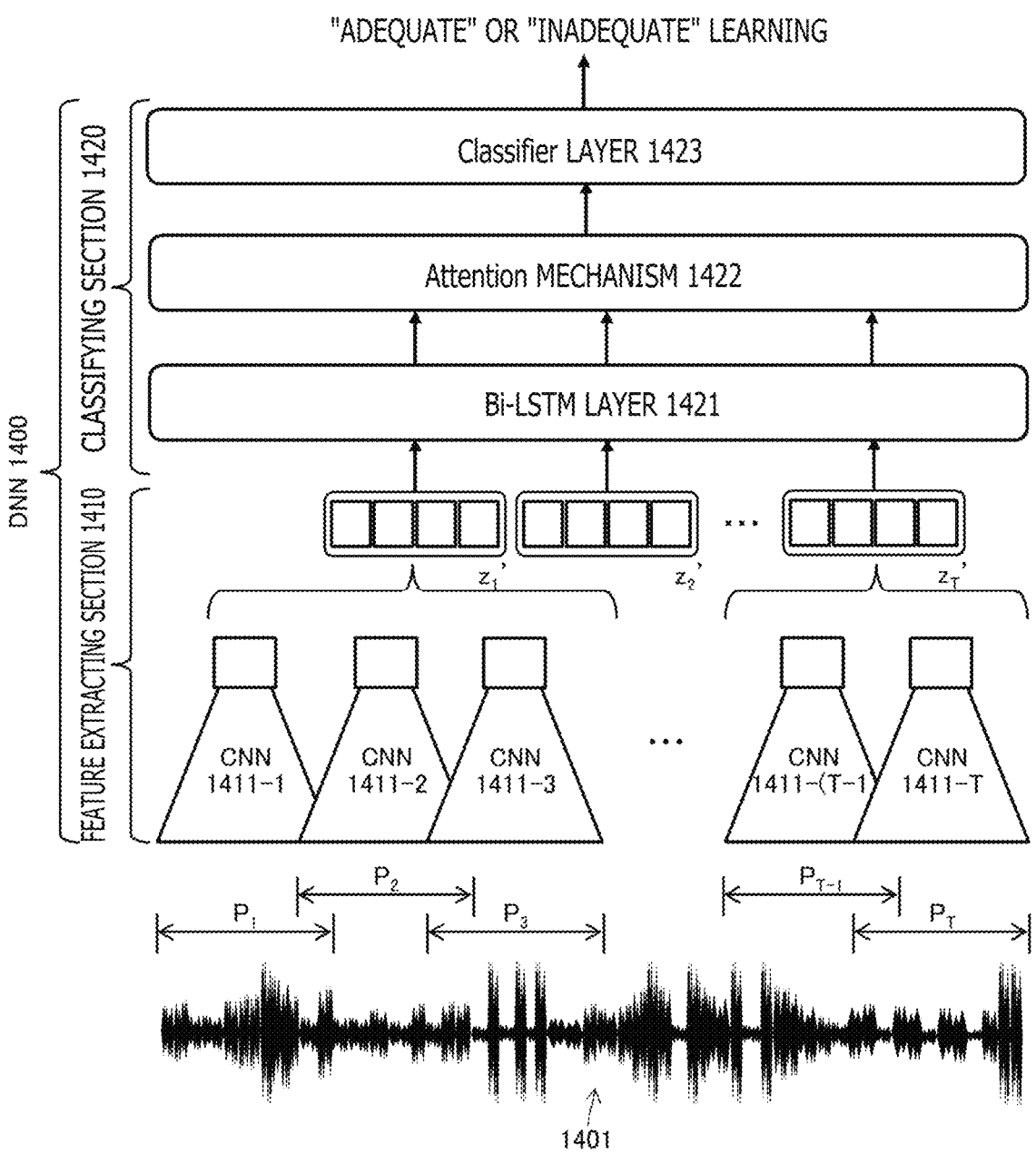
FIG. 14 is a diagram depicting an internal configuration example of a determining section 103 including a DNN.

FIG. 14 schematically depicts an internal configuration example of the determining section 103 including a DNN 1400. The internal configuration of the determining section 103 depicted in FIG. 14 is explained below.

A feature extracting section 1410 includes a plurality of CNNs 1411-1, 1411-2, . . . , and 1411-T (T CNNs in the example depicted in FIG. 14). Each CNN 1411-1, 1411-2, . . . , or 1411-T receives input of pieces of period data formed by dividing time-series media information (e.g., a sound waveform signal of a sound pronounced by a user) 1401 into time periods $P_1$, $P_2$, $P_3$, . . . , and $P_T$ having a predetermined length. It should be noted that the time-series media information is divided into the pieces of period data such that each pair of adjacent time periods includes an overlapping area. Each of CNN 1411-1, 1411-2, . . . , and 1411-T extracts features of input data by using a feature filter on a convolutional layer, eventually downsamples the features on a pooling (Global Average Pooling: GAP) layer, and encodes the features into input data to be input to a classifying section 1420 on the downstream side. In the example depicted in FIG. 14, the feature extracting section 1410 outputs feature quantities $z_1'$, $z_2'$, . . . , and $z_T'$ generated by combining output of a predetermined amount of CNNs in the CNN 1411-1, 1411-2, . . . that have received input of a plurality of consecutive pieces of period data, and outputs the feature quantities $z_1'$, $z_2'$, . . . , and $z_T'$ to the classifying section 1420 on the downstream side and a distance learning model (described later) that estimates distance information.

A self-training model is used for the feature extracting section 1410 as described later, but its use is not only for making it easier for the classifying section 1420 on the downstream side to perform classification, but also for overcoming difficulty in collecting data of movements or actions performed by a user. In a case where sound signals are treated as time-series media information, such as a case where training for pronunciations of a user is performed for language learning or the like, wav2vec or wav2vec2.0 can be used as the feature extracting section 1410, for example. In addition, in a case where a video is treated as time-series media information in order to perform training of a physical movement of a user for a sport or the like, CVRL (Contrastive Video Representation Learning) or PCL (Pretext-Contrastive Learning) can be used as the feature extracting section 1410.

The classifying section 1420 classifies whether or not a movement or action by a user is close to a reference movement or action, that is, whether or not learning by the user has been performed adequately, on the basis of feature quantities of the movement or action by the user that are extracted by the feature extracting section 1410. In the example depicted in FIG. 14, the classifying section 1420 includes a Bi-LSTM layer 1421 and a Classfier layer 1423, and has an Attention mechanism 1422 incorporated thereinto.

The Bi-LSTM (Bidirectional LSTM) layer 1421 is an improved neural network of an RNN (Recurrent Neural Network) called a bidirectional LSTM (Long Short-Term Memory), and integrates results obtained by performing LSTM from left to right and results obtained by performing LSTM from right to left.

Here, neural networks are explained briefly. A neural network includes three layers which are an input layer, an interlayer (or a hidden layer), and an output layer, and each layer is provided with a necessary amount of unit elements called neurons. Neurons of the input layer and neurons of the interlayer are coupled with each other with weights being given thereto. Similarly, neurons of the interlayer and neurons of the output layer are coupled with each other with weights being given thereto. Then, data such as feature quantities is input, and training of the neural network is performed by updating weighting factors such that correct recognition results can be output by using error backpropagation in which error signals are backpropagated, for example. Error signals described here are signals representing differences between output signals of the output layer and teaching signals. The RNN is a neural network having a loop therein, and can dynamically update the internal state while storing past information. The interlayer of the RNN is replaced with an LSTM block to configure the LSTM in order to create a model of long-term data. The LSTM block has three gates, which are an input gate, a forget gate, and an output gate, and a memory cell. The memory cell represents the internal state, and can retain long-term information. The input gate and the output gate plays a role of adjusting input data and output data, respectively. The forget gate plays a role of adjusting a memory cell input from the previous time.

Explanation regarding the DNN 1400 is continued with reference to FIG. 14 again. The Classfier layer 1423 determines whether or not learning by a user is adequate on the basis of results of inference of time-series media information by the Bi-LSTM layer 1421, and output a result of the determination. For example, in a case of language learning, the Classfier layer 1423 determines whether or not pronunciations by a user are at the level of native speakers. In addition, in a case of training for a sport, the Classfier layer 1423 determines whether or not physical movements of a user are at the level of those by a professional sport player or a trainer.

The Attention mechanism 1422 detects a portion which is in input time-series media information and which serves as a ground for determining that learning by a user is inadequate, in a case where the learning by the user is determined as inadequate at the Classfier layer 1423. Attention is one of methods of implementing the XAI technology, and is well-known in the art as a technique for incorporating, into a machine learning model, a mechanism to point out points of interest of input data when a model performs classification. For example, in a case of language learning, when the Classfier layer 1423 determines that a pronunciation by a user is different from that by a native speaker, the Attention mechanism 1422 can identify portions in a sound waveform signal at which the sound waveform signal is different from a sound waveform signal of a native speaker, as depicted in FIG. 4. In addition, in a case where a correspondence between a sound waveform signal and a character string (e.g., "This was easy for us") is known, the Attention mechanism 1422 can also identify words or character strings that are determined as being pronounced differently from pronunciations made by a native speaker.

Figure 15:
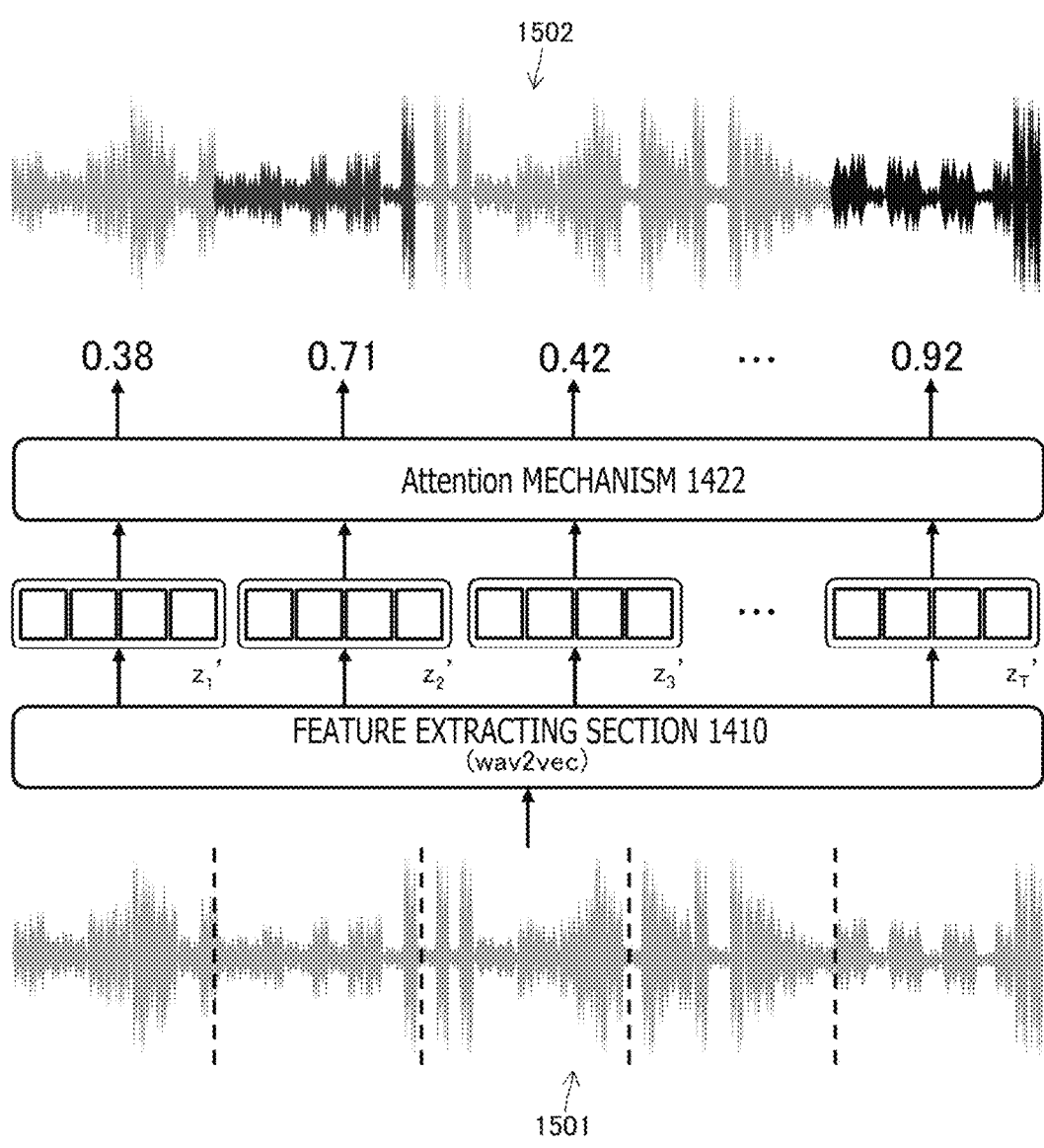
FIG. 15 is a diagram for explaining operation of an Attention mechanism.

Operation of the Attention mechanism 1422 is explained with reference to FIG. 15. It should be noted that it is supposed in the case depicted in FIG. 15 that a raw sound waveform signal 1501 is input as time-series media information. The feature extracting section 1410 configured with use of wav2vec or the like outputs feature quantities $z_1'$, $z_2'$, $z_3'$, . . . , and $z_T'$ extracted from the sound waveform signal 1501. Then, a classifying section 1423 (not depicted in FIG. 15) determines that the sound waveform signal 1501 of the user is different from a reference sound waveform signal (or an ideal sound waveform signal of a native speaker) on the basis of the feature quantities $z_1'$, $z_2'$, $z_3'$, . . . , and $z_T'$. At this time, the Attention mechanism 1422 points out to which time periods in the time periods of the input sound waveform signal the classifying section 1423 has paid attention to make the determination. In the example depicted in FIG. 15, the Attention mechanism 1422 expresses the degree of contribution of each time period in the sound waveform signal to the determination result that "the sound waveform signal is different from the ideal sound waveform signal" by using numerical values 0.38, 0.71, 0.42, . . . , and 0.92 in the range of 0 to 1. It should be noted that greater numerical values represent greater degrees of contribution to the determination result. The presenting section 104 can highlight portions in the sound waveform signal at which the sound waveform signal is different from that of the native speaker, as represented by a reference numeral 1502, on the basis of the output of the Attention mechanism 1422. In addition, the presenting section 104 changes the levels of highlighting of a plurality of portions at which the sound waveform signal is different from that of the native speaker, according to the calculated numerical values.

In addition, although not depicted in FIG. 14, as described in item B-5 described above, the determining section 103 determines distance information representing how much different the entire movement or action performed by a user is from a reference movement or action, by using a distance learning model. The distance learning model is trained such that the distance learning model estimates the distance between a movement or action by a user and a reference movement or action, on the basis of feature vectors represented by, as elements, the feature quantities $z_1'$, $z_2'$, $z_3'$, . . . , and $z_T'$ extracted, by the feature extracting section 1410, from time-series media information which is input data.

A basic loss function such as Contrastive Loss or Triplet Loss can be used for the training of the distance learning model. Here, Contrastive Loss is loss calculated on the basis of the distance between two points. In addition, as depicted in FIG. 16, Triplet Loss is loss calculated for one set of three feature quantities which are an Anchor feature quantity which serves as a reference feature quantity, a Positive feature quantity of the same label as Anchor, and a Negative feature quantity different from Anchor. Further, if the Anchor, Positive, and Negative feature quantities are arranged as vectors on a space, the distance between Anchor and Positive is defined as $d_p$, and the distance between Anchor and Negative is defined as $d_n$, $L_{triplet}=[d_p-d_n-\alpha]+$ can be defined as Triplet Loss (n.b., $\alpha$ is a hyperparameter representing a margin). The upper part in FIG. 16 depicts a method of computation of Triplet Loss in a case where a professional (or an ideal) is treated as Positive and a learner is treated as Negative. In addition, the lower part in FIG. 16 depicts a method of computation of Triplet Loss in a case where a learner is treated as Positive and a professional (or an ideal) is treated as Negative.

The determining section 103 can determine distance information regarding the distance between a movement or action by a user and a reference movement or action, on the basis of time-series media information obtained by sensing of the movement or action performed by the user, by using a trained distance learning model. Then, as depicted in FIG. 11, the presenting section 104 can visualize and present differences between the movement or action by the user and the reference movement or action, as distance information on a two-dimensional plane. Accordingly, the user can understand whether her/his movement or action is close to or far different from the reference movement or action, from visualized information as the one depicted in FIG. 11.

C-2. Training Methods

Next, training methods of machine learning models used by the determining section 103 are explained.

Deep learning requires a large amount of training data. If one attempts to perform supervised-training of the DNN 1400 for making determinations regarding movements or actions performed by a user, the burden of work of collecting a huge amount of user movement data (sounds, videos, etc.) and performing annotation for labelling each piece of data is excessive. If adequate training is not performed, such problems as instable operation of the DNN 1400 or determination errors of the DNN 1400 occur.

For supervised-training of the classifying section 1420 on the downstream side of the DNN 1400, training is performed with use of movement data of a user (or a beginner who is at the same level as the user) and ideal movement data of professionals, for example. However, it is often difficult to collect movement data of a user. For example, in a case of language learning, sound data of native speakers can be collected relatively easily through various types of media such as television or radio broadcast or video distribution services on the Internet, but it is difficult to collect sound data of pronunciations made by scholars.

In view of this, according to proposals of the present disclosure, self-training of the feature extracting section 1410 on the upstream side of the DNN 1400 used at the determining section 103 is performed with use of a large amount of data collected through broadcast, distribution services, and the like, and supervised-training of the classifying section 1420 on the downstream side is performed.

Figure 17:
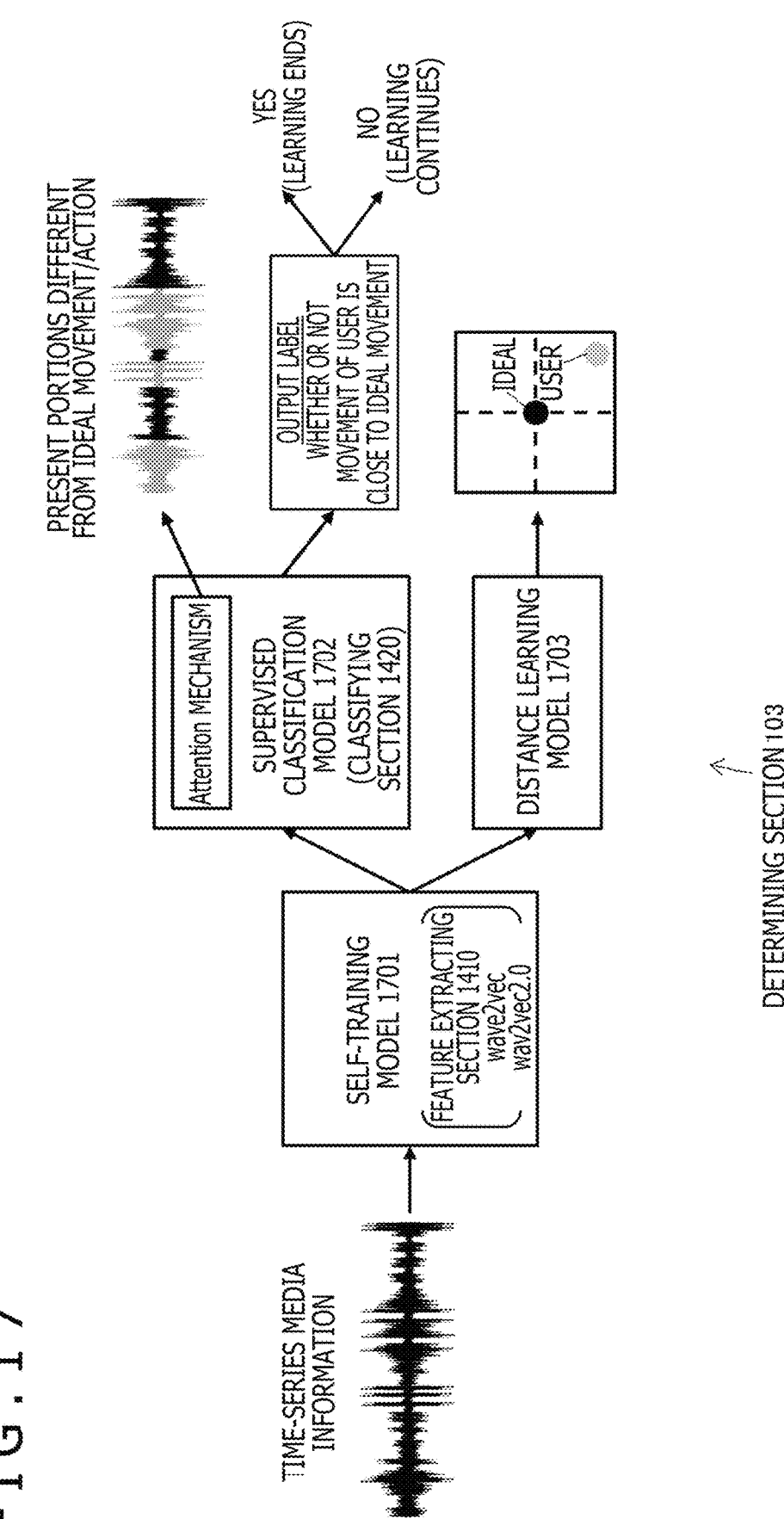
FIG. 17 is a diagram depicting an internal configuration example of the determining section 103 with a focus on differences between training methods.

FIG. 17 depicts an internal configuration example of the determining section 103 with a focus on differences between training methods. In the example depicted in FIG. 17, the determining section 103 includes a self-training model 1701, a supervised classification model 1702, and a distance learning model 1703. In addition, an Attention mechanism is incorporated in the supervised classification model 1702.

The self-training model 1701 corresponds to the feature extracting section 1410 in FIG. 14. The self-training model 1701 is created by self-training using good expressions in time-series media information such as sounds or videos that a user wishes to learn. Good expressions mean expressions that can easily be classified by the supervised classification model 1702 on the downstream side. In a case where language learning is to be assisted, for example, a self-training model for sounds, such as wav2vec or wav2vec2.0, is used, and in a case where training for physical movements such as sports are to be assisted, for example, a self-training model for videos, such as CVRL or PCL, can be used.

In addition to being used for making it easier to perform classification at the supervised classification model 1702 on the downstream side, the self-training model 1701 is also used for overcoming difficulty in collecting data (time-series media information) of movements or actions performed by a user. The supervised classification model 1702 on the downstream side is trained by using movement data of a user and ideal movement data of professionals or the like, but it is often difficult to collect movement data of a user (or a beginner who is at a level similar to that of the user). Meanwhile, ideal movement data of professionals or the like (utterance data of native speakers, etc.) can be collected in a large amount through television or radio broadcast, video distribution services via the Internet, or the like. By performing self-training by using data that can be collected in a large amount, the self-training model 1701 becomes able to obtain expressions that can easily be classified at the supervised classification model 1702 on the downstream side.

The supervised classification model 1702 corresponds to the classifying section 1420 in FIG. 14, and includes a DNN supporting temporal sequences, such as an RNN or an LSTM which is an improved version of an RNN. The supervised classification model 1702 classifies movement data of a user and reference movement data on the basis of expressions obtained by the self-training model 1701 on the upstream side.

By being incorporated into the supervised classification model 1702, the Attention mechanism visualizes information as to to which portion in movement data of a user the supervised classification model 1702 has paid attention to perform classification (e.g., see FIG. 4 to FIG. 6). A point of interest of the supervised classification model 1702 when it classifies a movement of a user as being different from an ideal movement by a professional or the like is equivalent to a portion in the movement or action performed by the user at which the movement or action is different from the ideal movement or conduct of the professional or the like. The Attention mechanism outputs a numerical value in the range of 0 to 1 as the degree of attention that it has paid at a time of classification, for each period in time-series media information. Then, by visualizing and presenting portions with great numerical values on the time-series media information or by displaying numerical values of periods in the time-series media information (see FIG. 15), it becomes easier for a user to understand which portion(s) in her/his movement or action is (are) different from the ideal movement or conduct and how much different that (those) portion(s) is (are).

The distance learning model 1703 computes distance information representing how much different the entire movement or action performed by the user is from the reference movement or action, on the basis of expressions obtained by the self-training model 1701 on the upstream side. A basic loss function such as Contrastive Loss or Triplet Loss can be used for the training of the distance learning model 1703 (described above). Then, as depicted in FIG. 11, the presenting section 104 can visualize and present differences between the movement or action by the user and the reference movement or action as distance information on a two-dimensional plane.

Next, a self-training method of the self-training model 1701 is explained with reference to FIG. 18.

The self-training model 1701 corresponds to the feature extracting section 1410 in FIG. 14, and includes CNNs. In a case where sound signals are treated as time-series media information, for example, wav2vec or wav2vec2.0 can be used as the self-training model 1701. In addition, in a case where videos are treated as time-series media information in order to perform training for physical movements of a user for a sport or the like, CVRL or PCL can be used as the self-training model 1701. FIG. 18 takes as an example a case where wav2vec2.0 is used, and depicts a sound recognition framework using Transformer. The sound recognition framework includes an encoding section 1801 including CNNs that convolve sound signals into latent representations and a Transformer section 1802 that obtains context representations from the latent representations.

Each CNN of the encoding section 1801 convolves period data obtained by dividing a sound waveform signal into data for each time period, and outputs latent representation Z. The Transformer section 1802 receives input of a quantized representation Q of a latent representation Z of each time period, and obtains a context representation C. Then, by using Contrastive Loss of a latent representation Z and a context representation C of each time period for a loss function, self-training of the self-training model 1701 (i.e., the entire sound recognition framework) is performed such that the context representation C of each time period approximates to the latent representation Z of the corresponding time period but the degree of approximation to latent representations Z of other time periods lowers.

The encoding section 1801 including CNNs in the self-trained sound recognition framework is used as the self-training model 1701. Explaining in terms of FIG. 14, the encoding section 1801 including CNNs is used as the feature extracting section 1410.

Then, when the supervised classification model 1702 is to be trained, training of the self-training model 1701 is stopped, training data (i.e., labeled time-series media information) is input to and convolved by the self-training model 1701, and extracted feature quantities are input to the supervised classification model 1702. Then, supervised-training of the supervised classification model 1702 is performed by using error backpropagation such that a loss function based on errors between the training data and classified data output from the supervised classification model 1702 are minimized.

In addition, when the distance learning model 1703 is to be trained, training of the self-training model 1701 is stopped, training data is input to and convolved at the self-training model 1701, and extracted feature quantities are input to the distance learning model 1703. Then, distance training of the distance learning model 1703 is performed by error backpropagation by using a basic loss function such as Contrastive Loss or Triplet Loss.

D. Application Examples

The information processing system 100 to which the present disclosure is applied can assist learning by a learning user by using time-series media information representing movements or actions performed by the user. Examples of time-series media information include information such as videos, sounds, or sentences that can be recognized on the basis of sensor data or signals that can be sensed by the sensor section 101. For example, sensor data acquired by a swing sensor attached to a golf club or a bat, biosignals acquired by an IMU (Inertial Measurement Unit) or a vital sensor attached to a user in training for a sport, and the like can also be used as time-series media information.

FIG. 19 summarizes a relation between the contents of learning that can be assisted by the present disclosure and types of time-series media information.

In a case where the present disclosure is applied to language learning, the information processing system 100 can be used to assist learning performed by a user, by treating, as time-series media information, sound signals of sounds uttered by a user, sentences obtained by sound recognition, sentences written by a user, and the like.

In a case where the present disclosure is applied to musical instrument performance, the information processing system 100 can be used to assist a user to master musical instrument performance, by treating, as time-series media information, sound signals of performance of a musical instrument played by a user or a video capturing images of a user during performance.

In a case where the present disclosure is applied to a speech or an address, the information processing system 100 can be used to assist a user to improve her/his skill for a speech or an address, by treating, as time-series media information, sound signals of sounds uttered by a user, sentences or a manuscript obtained by sound recognition of utterance made by a user, or a video capturing images of a user during a speech or an address.

In a case where the present disclosure is applied to training for golf, baseball, or other sports, the information processing system 100 can be used to assist training of a user by treating, as time-series media information, a video capturing images of the user in training. In addition, although omitted in FIG. 19, sensor data acquired by a swing sensor attached to a golf club or a bat, biosignals acquired by an IMU or a vital sensor attached to a user in training for a sport, or the like also can be used as time-series media information.

In a case where the present disclosure is applied to cooking, the information processing system 100 can be used to assist a user to cook, by treating, as time-series media information, a video capturing images of a user during cooking.

In a case where the present disclosure is applied to various types of treatment such as surgeries, other medical practices, and, further, massages, the information processing system 100 can be used to assist a user to improve the skill for medical care or procedures, by treating, as time-series media information, a video capturing images of the user during a surgery, a medical examination, or a procedure.

In a case where the present disclosure is applied to writing activities of novels, screenplays, or translation carried out by a user, the information processing system 100 can be used to assist the writing skill of the user by treating, as time-series media information, sentences written by the user.

In a case where the present disclosure is applied to acting in movies or dramas or to stand-up comedy, the information processing system 100 can be used to assist acting of a user, by treating, as time-series media information, a video obtained by capturing images of the user during acting, sounds uttered by the user, sentences obtained by sound recognition, or sentences of a script.

E. UI Examples

According to the information processing system 100 to which the present disclosure is applied, the determining section 103 can determine a learning level of a movement or action performed by a user, on the basis of time-series media information such as a video or sound representing the movement or action performed by the user, and, in a case where it is determined that there is an inadequately-learned portion, determine which portion in the movement or action by the user is inadequately-learned and how much inadequately-learned that portion is. Then, as feedback to the user, the presenting section 104 can visually present the portion in the time-series media information at which the movement or action by the user is different from a reference movement or action. In addition, if the user sets information regarding the reference movement or action in advance, she/he can perform learning that is preferable to her/himself.

In this item E, configuration examples of a UI (User Interface) for presenting, to a user, a result of a determination regarding a learning level of the user are explained. It is supposed that a screen to display the UI is a screen of a personal computer, a smartphone, or the like equipped with at least some constituent elements of the information processing system 100, for example.

Figure 20:
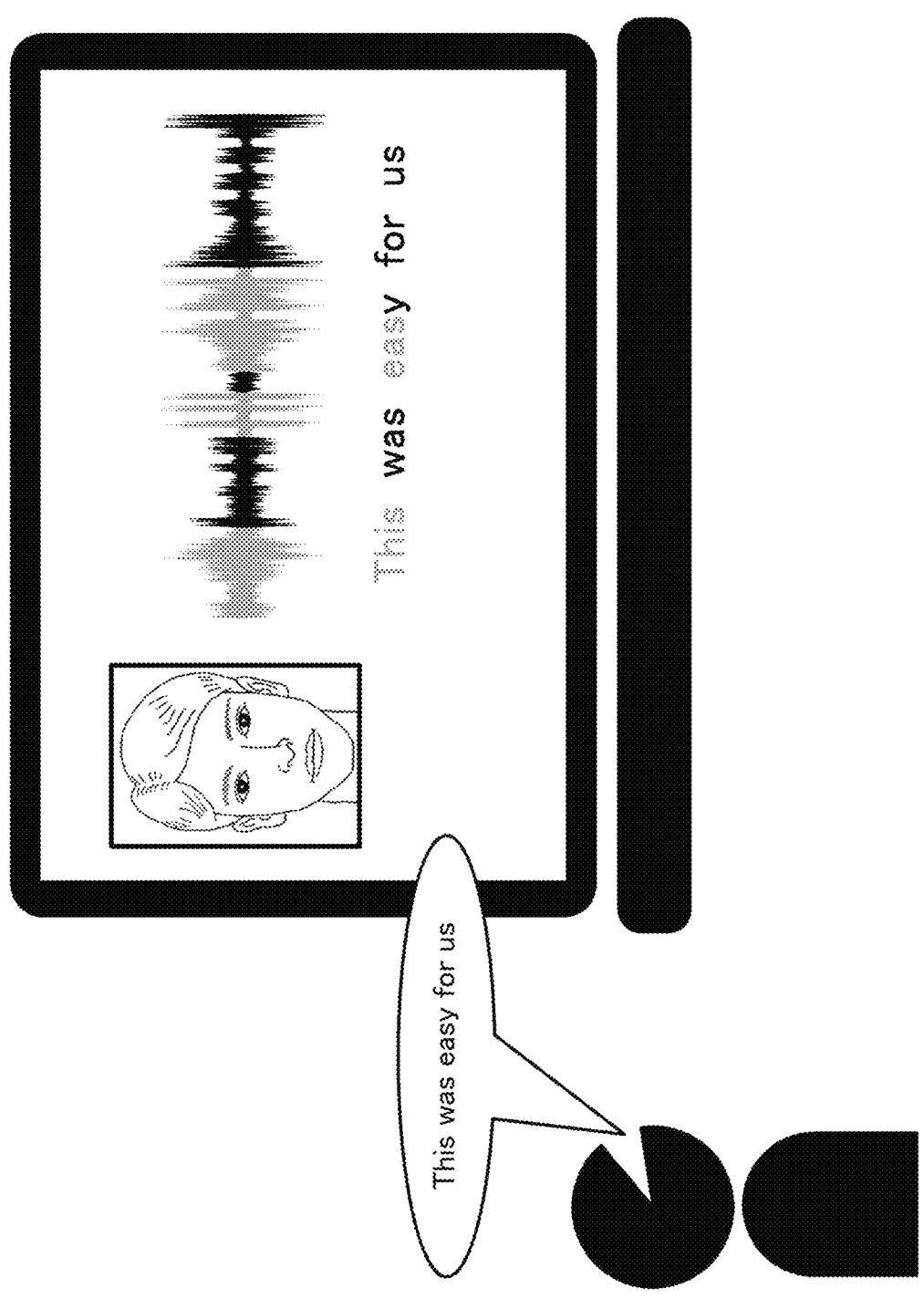
FIG. 20 is a diagram depicting a configuration example of a UI that presents a result of a determination regarding a learning level of a user to the user.

FIG. 20 depicts a configuration example of a UI screen that presents a result of a determination regarding an utterance made by a user when the user is learning a second language. This UI screen displays a sound waveform signal obtained when the user utters the phrase, "This was easy for us," along with the character string, "This was easy for us."

In a case where it is determined that the phrase, "This was easy for us," uttered by the user is different from that by a native speaker and there are portions at which learning by the user is inadequate, the determining section 103 determines which portions in the sound waveform signal are inadequately-learned and how much inadequately-learned the portions are. Then, as depicted in FIG. 20, the presenting section 104 highlights portions in the sound waveform signal at which the sound waveform signal is different from a sound waveform signal of the native speaker, and highlights words or character strings, "This," "eas," and "for," determined as being pronounced differently from the pronunciation made by the native speaker. In addition, owing to display of a video of the face of a native speaker uttering "This was easy for us" on the UI screen, the user can master the motion of a mouth for a pronunciation close to that of a native speaker. Needless to say, if information as to how much different the sound waveform signal of the user is from the pronunciation made by the native speaker, information regarding words or character strings in the phrase at which the utterance by the user is different from the pronunciation made by the native speaker, and the like can be presented, a UI with a screen layout other than that depicted in FIG. 20 may be adopted. In addition, for example, the user can set pronunciations which are ideal to the user, by setting in advance the native place (e.g., which of British English or American English in a case of English), age, social class, or the like of a native speaker who the user sees as a reference.

FIG. 21 depicts a configuration example of a UI screen that presents a result of a determination regarding violin performance by a user when the user is practicing performance of the violin. This UI screen displays a sound waveform signal produced by a violin played by the user along with a musical score of the performance.

In a case of determining that the violin performance by the user is different from performance by a professional violinist and there are portions at which learning by the user is inadequate, the determining section 103 determines which portions in the sound waveform signal are inadequately-learned and how much inadequately-learned those portions are. Then, as depicted in FIG. 21, the presenting section 104 highlights the portions in the sound waveform signal at which the sound waveform signal is different from that of the professional violinist, and also highlights notes of the portions on the musical score at which the sound waveform signal is different from that of the professional violinist. Needless to say, a UI with a screen layout other than that depicted in FIG. 21 may be adopted as long as information as to how much different the performance by the user as represented by the sound waveform signal of the violin played by the user is from the performance by the professional violinist, information regarding the notes on the musical score of the violin performance by the user at which the violin performance is different from that by the professional violinist, and the like can be presented. In addition, for example, the user can set performance which is ideal to the user, by setting in advance a used musical instrument, a system, a performance style, or the like of a professional violinist who the user sees as a reference.

Figure 22:
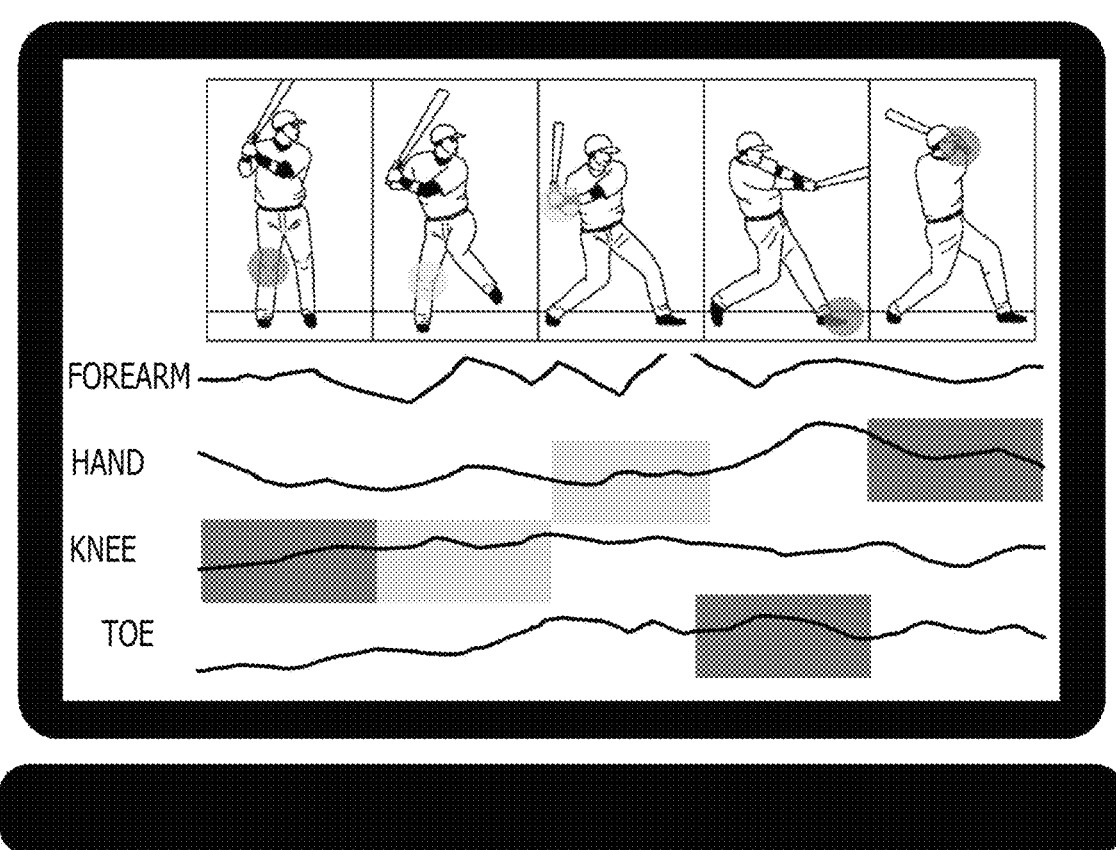
FIG. 22 is a diagram depicting a configuration example of a UI that presents a result of a determination regarding a learning level of a user to the user.

FIG. 22 depicts a configuration example of a UI screen that presents a result of a determination regarding a bat swing by a user when the user is practicing bat swings of baseball. On this UI screen, a plurality of still images in which the user is framed out at predetermined time intervals from a video of a bat swing by the user is arranged in time series, and a waveform signal representing change amounts of each of major body parts such as a forearm, a hand, a knee, or a toe is displayed.

In a case of determining that the bat swing by the user is different from a bat swing by a professional baseball player and there are portions in the bat swing by the user that are inadequately practiced, the determining section 103 determines which body parts of the body of the user are moving differently from those in the bat swing by the professional baseball player and how much different the movements of those body parts are. Then, as depicted in FIG. 22, the presenting section 104 highlights, in each of the still images arranged in time series, the body parts that are moving differently from those in the bat swing by the professional baseball player, and highlights also periods in a change signal of each body part in which the bat swing by the user is different from that by the professional baseball player. Needless to say, a UI with a screen layout other than that depicted in FIG. 22 may be adopted as long as it is possible to visually express which portions in the bat swing by the user are different from the bat swing by the professional baseball player and how much different those portions are. In addition, for example, the user can set a swing which is ideal to the user, by setting in advance age, physique, a play style, or the like of a professional baseball player who the user sees as a reference.

F. Apparatus Configuration Examples

F-1. Configuration Example of Information Processing Apparatus

FIG. 23 depicts a configuration example of an information processing apparatus 2300. The information processing apparatus 2300 is equivalent to a typical personal computer, for example. The information processing apparatus 2300 can operate as the apparatus 700 depicted in FIG. 7, the second apparatus 802 depicted in FIG. 8, the second apparatus 902 depicted in FIG. 9, and the second apparatus 1002 depicted in FIG. 10. Each element of the information processing apparatus 2300 is explained below.

A CPU (Central Processing Unit) 2301 is interconnected with each section, a ROM (Read Only Memory) 2302, a RAM (Random Access Memory) 2303, a hard disk drive (HDD) 2304, and an input/output interface 2305, via a bus 2310.

The CPU 2301 can execute a program loaded from the ROM 2302 or the HDD 2304 onto the RAM 2303, and realize various processes while temporarily retaining work data during the execution on the RAM 2303. Programs to be executed by the CPU 2301 include a basic input/output program stored on the ROM 2302 as well as an operating system (OS) and an application program which are installed on the HDD 1604. The OS provides an execution environment for the application programs. In addition, it is supposed that the application programs include an application program for learning assistance that performs determination regarding a learning level of a user or the like on the basis of sensor information (time-series media information).

The ROM 2302 is a read-only memory that permanently stores thereon the basic input/output program, apparatus information, and the like. The RAM 2303 includes a volatile memory such as a DRAM (Dynamic RAM), and is used as a work area of the CPU 2301. The HDD 2304 is a high-capacity storage apparatus that uses, as a recording medium, one or more magnetic discs fixed within the unit, and stores thereon programs and data in file formats. Instead of the HDD, an SSD (Solid State Drive) may be used.

The input/output interface 2305 is connected with various input/output devices such as an output section 2311, an input section 2312, a communication section 2313, and a drive 2314. The output section 2311 includes a display apparatus such as an LCD (Liquid Crystal Display), a speaker, a printer, and other output devices, and, for example, outputs results of program executed by the CPU 1601. A result of a determination regarding a learning level of a user can be presented by using the display apparatus. The input section 2312 includes a keyboard, a mouse, a touch panel, and other input devices, and accepts instructions from a user. In addition, the input section 2312 includes a microphone, a camera, and other sensors, and acquires time-series media information such as videos or sounds related to movements or actions performed by a user. In addition, the output section 2311 and the input section 2312 may include a USB, an HDMI (registered trademark), or other interfaces for external connection with externally attached output devices and input devices.

The communication section 2313 includes a wired or wireless communication interface conforming to predetermined communication standards, and performs data communication with external apparatuses. Examples of the wired communication interface include an Ethernet (registered trademark) communication interface, for example. In addition, examples of the wireless communication interface include Wi-Fi (registered trademark) and Bluetooth (registered trademark) communication interfaces. In a case where the information processing apparatus 2300 operates as the second apparatus, the communication section 2313 communicates with the first apparatus.

In addition, the communication section 2313 is connected to a wide area network such as the Internet. With use of the communication section 2313, an application program (described above) can be downloaded from a download site on the Internet and installed on the information processing apparatus 2300, for example.

When a removable recording medium 1615 is loaded into the drive 2314, the drive 2314 performs a process of reading out from the removable recording medium 2315 and a process of writing into the removable recording medium 2315 (n.b., in a case where the removable recording medium 2315 is a rewritable recording medium). The removable recording medium 2315 has recorded thereon programs, data, and the like in file formats. For example, the removable recording medium 2315 having stored thereon package software such as an application program (described above) can be loaded into the drive 2314, and the package software can be installed on the computer 2300. Examples of the removable recording medium 2315 include a flexible disc, a CD-ROM (Compact Disc Read Only Memory), an MO (Magneto Optical) disc, a DVD (Digital Versatile Disc), a magnetic disc, a semiconductor memory, and the like, for example.

F-2. Configuration Example of Information Terminal

Figure 24:
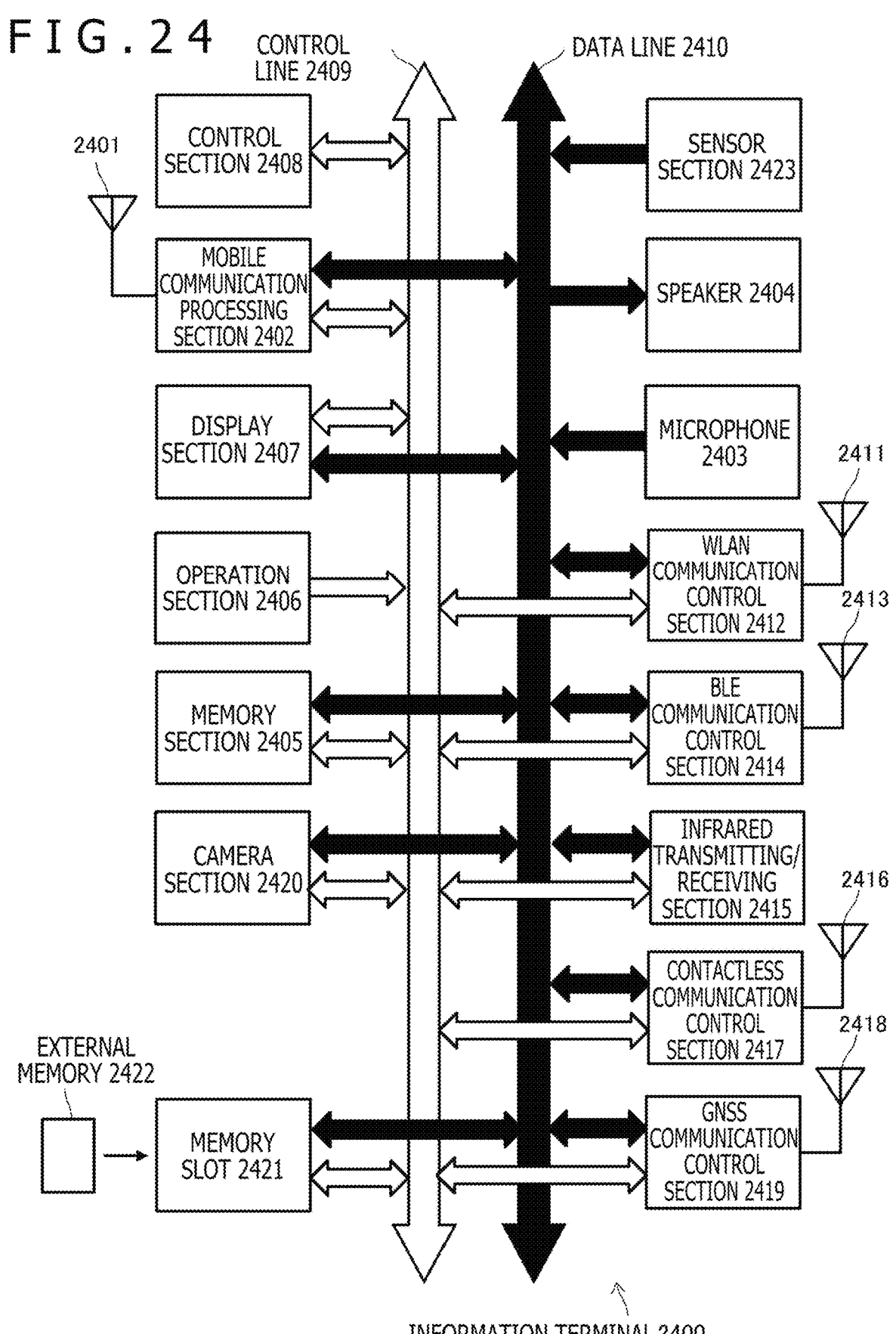
FIG. 24 is a diagram depicting a configuration example of an information terminal 2400.

FIG. 24 depicts a configuration example of an information terminal 2400. The information terminal 2400 is equivalent to a multifunctional information terminal such as a smartphone or a tablet, for example. The information terminal 2400 can operate as the apparatus 700 depicted in FIG. 7, the first apparatus 801 depicted in FIG. 8, the first apparatus 901 depicted in FIG. 9, and the first apparatus 1001 depicted in FIG. 10.

The information terminal 2400 includes a viscera antenna 2401, a mobile communication processing section 2402, a microphone 2403, a speaker 2404, a memory section 2405, an operation section 2406, a display section 2407, a control section 2408, a control line 2409, a data line 2410, a WLAN communication antenna 2411, a WLAN communication control section 2412, a BLE (Bluetooth (registered trademark) Low Energy) communication antenna 2413, a BLE communication control section 2414, an infrared transmitting/receiving section 2415, a contactless communication antenna 2416, a contactless communication control section 2417, a GNSS (Global Navigation Satellite System) receiving antenna 2418, a GNSS positioning section 2419, a camera section 2420, a memory slot 2421, and a sensor section 2423. Each constituent element of the information terminal 2400 is explained below.

The viscera antenna 2401 is configured to perform reception of signals transmitted through a mobile phone network such as an LTE network or an NR network and transmission of signals to be sent to the mobile phone network from the information terminal 2400. The mobile communication processing section 2402 performs demodulation and decoding processes on signals received by the viscera antenna 2401 and encoding and modulation processes on transmission data to be sent to the mobile phone network via the viscera antenna 2401.

The microphone 2403 collects sounds, converts the sounds into electric signals, and further performs AD conversion. Sound signals digitized by the microphone 103 are supplied to the mobile communication processing section 2402 through the data line 2410, are subjected to the encoding and modulation processes, and thereafter are sent to the mobile phone network through the built-in antenna 2401. Whereas the microphone 2403 mainly realizes functionalities as a mouthpiece, in the present embodiment, it functions also as the sensor section 101 that collects utterance made by a user and that acquires sound waveform signals (time-series media information).

The speaker 2404 mainly realizes functionalities as an earpiece, performs DA conversion on digital sound signals supplied from the mobile communication processing section 2402 through the data line 2410, further performs an amplification process and the like on the digital sound signals, and thereafter emits sounds.

The memory section 2405 includes a non-volatile memory such as a ROM, a RAM, an EEPROM (Electrically Erasable and Programmable ROM), or a flash memory, for example.

The ROM has important data stored and retained thereon such as various types of program codes to be executed by a CPU (Central Processing Unit) included in the control section 2408 (described later), a program code for operation of an e-mail process of editing e-mails, various types of programs (applications) such as a program for processing images captured by a camera section 120, identification information (ID) of a mobile phone terminal, or data required for various types of processes. The RAM is mainly used as a work area for temporarily storing intermediate results of a process while the CPU is executing various types of processes, for example.

The non-volatile memory has non-volatilely stored and retained thereon data that should be retained even if the power supply of the information terminal 2400 is turned off. Examples of data stored and retained on the non-volatile memory include address book data, e-mail data, image data of images captured by the camera section 2420, various types of Web data such as image data or text data downloaded through the Internet, various types of setting parameters, dictionary information, and additional programs.

For example, the operation section 2406 includes a touch panel superimposed on a screen of the display section 2407 (described later), a numerical keypad, a keypad of several symbols, a keypad of several functions, what is generally called a jog-dial key that is capable of performing rotational operation and pressing operation, and the like. Further, the operation section 2406 accepts operation input from a user of the information terminal 2400, converts the operation input into electric signals, and supplies the electric signals to the control section 2408 through the control line 2409. As a result, the control section 2408 can control each section according to an instruction from the user, and perform a process according to the user instruction.

For example, the display section 2407 includes a flat display element such as an organic EL (Electro Luminescence) or an LCD and a control circuit therefor, and displays various types of information supplied through the control line 2409. For example, such information as various types of image data or e-mail data taken in through the built-in antenna 2401 and the mobile communication processing section 2402, text data input through the operation section 2406, operation guidance or various types of message information prepared in advance, or image data taken in through the camera section 2420 can be displayed. In a case where the operation section 2406 includes a touch panel superimposed on the screen of the display section 2407, a user can perform direct input operation on objects displayed on the screen.

The control section 2408 is a main controller that comprehensively controls the information terminal 2400. Specifically, the control section 2408 includes a CPU, loads a program stored on the ROM or the like of the memory section 2405 onto the RAM, executes the program, generates control signals to be supplied to each section, and passes the control signals to each section through the control line 2409. Programs executed by the control section 108 include a program (application) that performs a process related to determination regarding a learning level of a user, for example. In addition, by being provided with information from each section, the control section 2408 generates new control signals according to the information, and supplies the control signals through the control line 2409.

The control line 2409 is a bus line mainly for transferring control signals and various types of information associated with control. In addition, the data line 2410 is a bus line for transferring various types of data which are the subjects of transmission and reception, such as sound data, image data, or e-mail data, and various types of data which are the subjects of processes.

For example, the WLAN communication antenna 2411 is configured to perform reception of signals transmitted through a WLAN that uses an unlicensed band such as the 2.4 GHz band or the 5 GHz band and transmission of signals to be sent to the WLAN from the information terminal 2400. The WLAN communication control section 2412 controls WLAN communication operation using the unlicensed band, and performs demodulation and decoding processes on reception signals received by the WLAN communication antenna 2411 and encoding and modulation processes on transmission data to be sent to the WLAN via the WLAN communication antenna 2411. The WLAN communication control section 112 controls one-to-one wireless communication in an ad-hoc mode and wireless communication that is connected to a WLAN by connection to a neighboring access point in an infrastructure mode.

The BLE communication antenna 2413 is configured to transmit and receive BLE signals. The BLE communication control section 2414 controls BLE communication operation, and performs demodulation and decoding processes on reception signals received by the BLE communication antenna 2411 and encoding and modulation processes on transmission data to be sent via the BLE communication antenna 2411.

The infrared transmitting/receiving section 2415 includes an LED (Light Emitting Diode) for infrared light-emission and a photodetector for infrared light-reception, and performs transmission and reception of signals by using infrared rays in the frequency band which is slightly lower than the visible light band. Through this infrared transmitting/receiving section 2415 exchange of data such as e-mail addresses or images, for example, can be performed by transmission and reception of infrared light by bringing the information terminal 2400 close to another terminal. Infrared communication can be performed while maintaining security, since the communication is performed between mobile phone terminals which are at a very short distance from each other.

The contactless communication antenna 2416 is configured to transmit, receive, or transmit and receive contactless signals using an electromagnetic induction effect. For example, the contactless communication control section

2417 controls contactless communication operation using a contactless communication technology such as FeliCa (registered trademark). Specifically, the contactless communication control section 2417 controls operation as a card, a reader, or a reader/writer in a contactless communication system.

The GNSS receiving antenna 2418 and the GNSS positioning section 2419 identify the current position of the information terminal 2400 by analyzing GNSS signals received from GNSS satellites. Specifically, the GNSS receiving antenna 2418 receives GNSS signals from a plurality of GNSS satellites, and the GNSS positioning section 2419 demodulates and analyzes the GNSS signals received through the GNSS receiving antenna 2418, in synchronization with each other, and computes positional information. The information regarding the current position calculated by the GNSS positioning section 2419 is used for a navigation functionality or metadata representing an image-capturing position added to image data of an image captured by the camera section 2420 (described later), for example.

Note that, although not depicted in FIG. 24, the information terminal 2400 further includes a clock circuit that provides the current year and date, the current day of the week, and the current time. The current date/time acquired from this clock circuit is added as metadata representing the date/time of image-capturing to image data of an image captured by the camera section 2420 (described later).

The camera section 2420 includes an objective lens, a shutter mechanism, and an image capturing element such as a CMOS (Complementary Metal Oxide Semiconductor) (none of them are depicted in FIG. 24). Further, when an electric signal of an image of a subject is taken in by the image capturing element, the electric signal can be converted into digital data, supplied to the memory section 2405 through the data line 2410, and recorded thereon. In the present embodiment, the turtle section 2420 functions also as the sensor section 101 that captures images of movements or actions performed by a learning user and that acquires videos (time-series media information).

For example, the memory slot 2421 is a device into which an external memory 2422 such as a microSD card configured to be attachable to and detachable from the memory slot 2421 is loaded. For example, a user can use the external memory 2422 as a user memory when the available storage capacity of the memory section 2405 is insufficient, or can load, into the memory slot 2421, the external memory 2422 having recorded thereon a program (application) for realizing a new functionality, to add the new functionality to the information terminal 2400.

The sensor section 2423 may include other sensor elements such as an illuminance sensor, an IMU (Inertial Measurement Unit), a TOF (Time Of Flight) sensor, a temperature sensor, or a humidity sensor. Note that the microphone 2403 can be regarded as a sound sensor, the GNSS communication control section 2419 can be regarded as a positioning sensor, the camera section 2420 can be regarded as an image sensor, and they can thereby be treated as parts of the sensor section 2423.

INDUSTRIAL APPLICABILITY

The present disclosure has been explained in detail thus far with reference to the particular embodiment. However, it is self-evident that those skilled in the art can make corrections or adopt substitutions in the embodiment within the scope not departing from the scope of the present disclosure.

Whereas the present specification principally explains the embodiment in which the present disclosure is applied to learning of utterance which mainly uses sounds input by a user, the scope of the present disclosure is not limited to this. For example, the present disclosure can be applied also to learning of physical movements which uses a video of a user captured by a camera and learning which uses a combination of sounds and a video. In addition, the present disclosure can be applied not only to utterance of a second language, but also to learning of sentences.

In addition, the contents explained in the present specification as a process intended for language learning using pronunciations made by a native speaker as reference may be performed as a process for reducing differences between pronunciations made by a user and reference pronunciations. For example, processes based on differences between a standard accent of a language and a regional accent of the language, the regional accent being spoken by a user, may be performed.

In addition, the fields of application of the present disclosure are not limited to language learning. For example, the present disclosure can similarly be applied also to learning of musical instrument performance, learning of a speech or an address (sounds, videos (physical movements), and learning of sentences), learning of various types of sports which uses videos, learning of cooking which uses videos, learning of various types of treatment such as surgeries, other medical practices, and massages which uses videos, learning of sentences in writing activities (novels, screenplays, translation, etc.), and learning of acting by actors, comedy duos, and the like (utterance, sentences, physical motions, etc.).

In summary, the present disclosure has been explained with reference to exemplary forms, and the description contents of the present specification should not be interpreted in a limited manner. Claims should be taken into consideration in order to determine the scope of the present disclosure.

It should be noted that the present disclosure can also have such configurations as the ones below.

(1)

An information processing method including:

an input step of inputting time-series media information representing a movement or conduct of a learning user;

a first determination step of determining a learning level of the user on the basis of the time-series media information; and an output step of outputting a portion in the time-series media information at which the movement or action by the user is different from a reference movement or action, on the basis of the learning level of the user determined at the first determination step.

(2)

The information processing method according to the above (1), in which, in the output step, the portion in the time-series media information at which the movement or action by the user is different from the reference movement or action is output to a presenting apparatus, and the information processing method further includes a first presentation step of presenting, through the presenting apparatus to the user, the portion in the time-series media information at which the movement or action by the user is different from the reference movement or action.

(3)

The information processing method according to the above (2), in which, in the first presentation step, the portion in time-series information media at which the movement or action by the user is different from the reference movement or action is visually presented.

(4)

The information processing method according to the above (3), in which, in the first presentation step, a word or character portion of a phrase uttered by the user, a pronunciation of the word or character portion being different from a reference pronunciation (or an ideal pronunciation by a native speaker), is visually presented.

(5)

The information processing method according to the above (3), in which, in the first presentation step, a body part of the user, the body part exhibiting a physical movement that is different from a reference physical movement (or an ideal physical movement by a professional player or a trainer), is visually presented.

(6)

The information processing method according to any one of the above (1) to (5), further including:

a second determination step of determining distance information representing a difference between the movement or action by the user and the reference movement or action; and a second presentation step of outputting a result of the determination in the second determination step to a presenting apparatus and presenting the result to the user.

(7)

The information processing method according to the above (6), in which, in the second presentation step, distance information is visually presented in an N-dimensional space in which the reference movement or action is arranged at a center.

(8)

The information processing method according to any one of the above (1) to (7), in which the input step and the first determination step are executed continuously until the learning level of the user is determined as adequate.

(9)

The information processing method according to any one of the above (1) to (8), in which, in the first determination step, the determination is made by using a trained machine learning model.

(10)

The information processing method according to the above (9), in which, in the first determination step, the learning level of the user is determined by using a supervised-trained second machine learning model, after the time-series media information is processed by using a self-trained first machine learning model.

(11)

The information processing method according to the above (10), in which, in the first determination step, a ground for determining that the learning level of the user is inadequate or for determining that learning by the user is necessary is determined regarding the time-series media information by using an Attention mechanism incorporated into the second machine learning model.

(12)

The information processing method according to the above (9), in which the machine learning model includes a feature extracting section that extracts a feature quantity of the time-series media information, and a classifying section that classifies the learning level on the basis of the extracted feature quantity.

(13)

The information processing method according to the above (12), in which the feature extracting section is trained by self-training, and the classifying section is trained by supervised-training by using the trained feature extracting section.

(14)

The information processing method according to the above (12) or (13), in which, in the first determination step, a ground for determining that the learning level of the user is inadequate or for determining that learning by the user is necessary is determined regarding the time-series media information by using an Attention mechanism incorporated into the classifying section.

(15)

The information processing method according to any one of the above (12) to (14), further including:

a second determination step of determining distance information representing a difference between the movement or action by the user and the reference movement or action, on the basis of the feature quantity of the time-series media information, the feature quantity being extracted by the feature extracting section.

(16)

The information processing method according to the above (15), in which, in the second determination step, the determination regarding the distance information is made by using a distance learning model in which Contrastive Loss or Triplet Loss is used for a loss function.

(17)

An information processing system including:

an input section that receives input of time-series media information representing a movement or conduct of a learning user;

a first determining section that determines a learning level of the user on the basis of the time-series media information; and an output section that outputs a portion in the time-series media information at which the movement or action by the user is different from a reference movement or action, on the basis of the learning level of the user determined by the first determining section.

(18)

The information processing system according to the above (17), further including:

a sensor section that detects the movement or conduct of the learning user and acquires the time-series media information; and a presenting apparatus that is used by the output section to output the portion in the time-series media information at which the movement or action by the user is different from the reference movement or action.

(19)

An information terminal including:

a sensor section that detects a movement or conduct of a learning user and acquires time-series media information;

a communication section that transmits the time-series media information to an external apparatus and receives, from the external apparatus, results of determinations regarding a learning level of the user and a portion in the time-series media information at which the movement or action by the user is different from a reference movement or action; and a presenting section that presents received information.

(20)

A computer program written in a computer-readable format such that a computer functions as:

an input section that receives input of time-series media information representing a movement or conduct of a learning user;

a first determining section that determines a learning level of the user on the basis of the time-series media information; and an output section that outputs a portion in the time-series media information at which the movement or action by the user is different from a reference movement or action, on the basis of the learning level of the user determined by the first determining section.

REFERENCE SIGNS LIST

100: Information processing system
101: Sensor section
102: Input section
103: Determining section
104: Presenting section
1400: DNN
1410: Feature extracting section
1411: CNN
1420: Classifying section
1421: Bi-LSTM layer
1422: Attention mechanism
1423: Classifying section
1701: Self-training model
1702: Supervised classification model
1703: Distance learning model
1801: Encoding section
1802: Transformer section
2300: Information processing apparatus
2301: CPU
2302: ROM
2303: RAM
2304: HDD
2305: Input/output interface
2310: Bus
2311: Output section
2312: Input section
2313: Communication section
2314: Drive
2315: Removable recording medium
2400: Information terminal
2401: Viscera antenna
2402: Mobile communication processing section
2403: Microphone
2404: Speaker
2405: Memory section
2406: Operation section
2407: Display section
2408: Control section
2409: Control line
2410: Data line
2411: WLAN communication antenna
2412: WLAN communication control section
2413: BLE communication antenna
2414: BLE communication control section
2415: Infrared transmitting/receiving section
2416: Contactless communication antenna
2417: Contactless communication control section
2418: GNSS receiving antenna
2419: GNSS positioning section

2420: Camera section
2421: Memory slot
2422: External memory
2423: Sensor section

The invention claimed is:

1. An information processing method, comprising:
inputting, to a trained machine learning model, time-series media information representing an action of a user,
  wherein the trained machine learning model:
    extracts, based on a self-training learning model, a feature quantity of the inputted time-series media information; and
    classifies, based on a supervised-training learning model, a learning level of the user based on the extracted feature quantity;
  receiving, from the trained machine learning model, the classified learning level of the user as an output of the trained machine learning model; and
  outputting, based on the classified learning level of the user, a portion in the time-series media information at which the action of the user is different from a reference action.

2. The information processing method according to claim 1, further comprising:
  outputting, to a presenting apparatus, the portion in the time-series media information, and
  presenting, via the presenting apparatus, the portion in the time-series media information.

3. The information processing method according to claim 2, further comprising displaying, on a display screen, the portion in the time-series media information.

4. The information processing method according to claim 3, wherein
  the portion in the time-series media information includes at least one of a word of a phrase uttered by the user, a character portion of the phrase uttered by the user, a pronunciation of the word different from a reference pronunciation of the word, or a pronunciation of the character portion different from a reference pronunciation of the character portion,
  the reference pronunciation of the word corresponds to an ideal pronunciation of the word by a native speaker, and
  the reference pronunciation of the character portion corresponds to an ideal pronunciation of the character portion by the native speaker.

5. The information processing method according to claim 3, wherein
  the portion in the time-series media information includes at least a body part of the user that exhibits a physical movement that is different from a reference physical movement, and
  the reference physical movement corresponds to an ideal physical movement by one of a professional player or a trainer.

6. The information processing method according to claim 1, further comprising:
  determining distance information representing a difference between the action of the user and the reference action; and
  outputting, to a presenting apparatus, the determined distance information, and
  presenting, via the presenting apparatus, the determined distance information.

7. The information processing method according to claim 6, further comprising visually presenting the determined distance information in an N-dimensional space in which the reference action is at a center of the N-dimensional space.

8. The information processing method according to claim 1, further comprising executing continuously each of the inputting of the time-series media information and the receiving of the classified learning level until the learning level of the user is adequate.

9. The information processing method according to claim 1, further comprising determining, based on the supervised-training learning model, the learning level of the user, after the time-series media information is extracted based on the self-training learning model.

10. The information processing method according to claim 9, further comprising determining, based on the supervised-training learning model, whether the learning level of the user is inadequate, and
  the supervised-training learning model includes an Attention mechanism.

11. The information processing method according to claim 1, further comprising determining, based on the self-training learning model, whether the learning level of the user is inadequate, and
  the self-training learning model includes an Attention mechanism.

12. The information processing method according to claim 1, further comprising determining based on the feature quantity of the time-series media information, distance information representing a difference between the action of the user and the reference action.

13. The information processing method according to claim 12, further comprising determining the distance information based on a distance learning model in which Contrastive Loss or Triplet Loss is used for a loss function.

14. An information processing system, comprising:
at least one processor configured to:
  receive, as an input, time-series media information that represents an action of a user;
  input the received time-series media information to a trained machine learning model,
  wherein the trained machine learning model:
    extracts, based on a self-training learning model, a feature quantity of the inputted time-series media information; and
    classifies, based on a supervised-training learning model, a learning level of the user based on the extracted feature quantity;
  receive, from the trained machine learning model, the classified learning level of the user as an output of the trained machine learning model; and
  output, based on the classified learning level of the user, a portion in the time-series media information at which the action of the user is different from a reference action.

15. The information processing system according to claim 14, further comprising:
a sensor configured to:
  detect the action of the user; and
  acquire the time-series media information; and
a display screen configured to display the portion in the time-series media information at which the action of the user is different from the reference action.

16. An information terminal, comprising:

a sensor configured to:

detect an action of a user; and acquire time-series media information that represents the action of the user;

a communication interface configured to:

transmit the time-series media information to a trained machine learning model, wherein the trained machine learning model:

extracts, based on a self-training learning model, a feature quantity of the inputted time-series media information; and classifies, based on a supervised-training learning model, a learning level of the user based on the extracted feature quantity;

receive, from the trained machine learning model, the classified learning level of the user; and receive, from an external apparats, a portion in the time-series media information at which the action of the user is different from a reference action, wherein the portion in the time-series media information is based on the classified learning level of the user; and a display screen configured to display the received portion in the time-series media information.

17. A non-transitory computer-readable medium having stored thereon, computer-executable instructions which, when executed by a processor, cause the processor to execute operations, the operations comprising:

inputting, to a trained machine learning model, time-series media information representing an action of a user, wherein the trained machine learning model:

extracts, based on a self-training learning model, a feature quantity of the inputted time-series media information; and classifies, based on a supervised-training learning model, a learning level of the user based on the extracted feature quantity;

receiving, from the trained machine learning model, the classified learning level of the user as an output of the trained machine learning model; and outputting, based on the classified learning level of the user, a portion in the time-series media information at which the action of the user is different from a reference action.

\* \* \* \* \*